US012564932B2

(12) United States Patent
Zhao

(10) Patent No.: US 12,564,932 B2
(45) Date of Patent: Mar. 3, 2026

(54) RATCHET WRENCH

(71) Applicant: MAKITA CORPORATION, Anjo (JP)

(72) Inventor: Ding Zhao, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 18/938,802

(22) Filed: Nov. 6, 2024

(65) Prior Publication Data

US 2025/0058451 A1 Feb. 20, 2025

Related U.S. Application Data

(63) Continuation of application No. 18/125,250, filed on Mar. 23, 2023, now Pat. No. 12,162,130, which is a (Continued)

(30) Foreign Application Priority Data

Aug. 3, 2017 (JP) ................................ 2017-150941

(51) Int. Cl.

| | |
|---|---|
| ***B25F 5/02*** | (2006.01) |
| ***B25B 21/00*** | (2006.01) |
| *B25B 23/00* | (2006.01) |

(52) U.S. Cl.

CPC ................ *B25F 5/02* (2013.01); *B25B 21/00* (2013.01); *B25B 21/004* (2013.01); *B25B 23/0035* (2013.01)

(58) Field of Classification Search

CPC .................................. B25F 5/02; B25B 21/00

See application file for complete search history.

(56) References Cited

U.S. PATENT DOCUMENTS 3,906,822 A 9/1975 Hertelendy et al.
4,791,826 A 12/1988 Behrens
(Continued)

FOREIGN PATENT DOCUMENTS

JP H07-124871 A 5/1995
JP 2000-504396 A 4/2000
(Continued)

OTHER PUBLICATIONS

Sep. 11, 2018 International Search Report issued in International Patent Application No. PCT/JP2018/027748.
(Continued)

*Primary Examiner* — Nathaniel C Chukwurah
(74) *Attorney, Agent, or Firm* — Oliff PLC

(57) ABSTRACT

An electric ratchet wrench as one example of the ratchet wrench includes an electric motor, a holder that rotatably holds a socket via a one-way clutch mechanism, and a spindle configured to convert a driving force from the motor into a reciprocating rotation motion of the holder. A space is provided between the socket and the holder. The space includes large interval portions and small interval portions. The small interval portions are adjacent to the large interval portions in a rotation direction (lock direction) of the socket and have distances smaller than distances of the large interval portions. Additionally, the one-way clutch mechanism includes columnar locking pins disposed between the spaces and have a diameter with a size equal to or less than the distances of the large interval portions and exceeding the distances of the small interval portions.

7 Claims, 16 Drawing Sheets

Related U.S. Application Data continuation of application No. 17/724,882, filed on Apr. 20, 2022, now Pat. No. 11,642,763, which is a continuation of application No. 16/633,103, filed as application No. PCT/JP2018/027748 on Jul. 24, 2018, now Pat. No. 11,338,413.

(56) References Cited

U.S. PATENT DOCUMENTS

| | | | |
|---|---|---|---|
| 6,990,877 | B1 | 1/2006 | Wu |
| 7,306,050 | B2 | 12/2007 | Chen |
| 7,400,106 | B2 | 7/2008 | DeCicco et al. |
| 8,186,246 | B2 | 5/2012 | Niven |
| 8,695,725 | B2 | 4/2014 | Lau et al. |
| 8,904,907 | B2 | 12/2014 | Douglass |
| 9,022,888 | B2 | 5/2015 | McClung |
| 9,272,397 | B2 | 3/2016 | Goetz et al. |
| 9,550,284 | B2 | 1/2017 | Seith et al. |
| 9,669,535 | B2 | 6/2017 | Yaschur et al. |
| 9,776,309 | B2 | 10/2017 | Fluhrer |
| 9,958,019 | B1 | 5/2018 | Douglass |
| 10,335,928 | B2 | 7/2019 | Wang |
| 2002/0144575 | A1 | 10/2002 | Niven |
| 2005/0061114 | A1 | 3/2005 | Lin et al. |
| 2005/0090216 | A1 | 4/2005 | Hsu et al. |
| 2006/0222931 | A1* | 10/2006 | Lin ........................... B25F 5/02 429/97 |
| 2010/0096151 | A1 | 4/2010 | Ostling |
| 2012/0118596 | A1 | 5/2012 | Scott |
| 2012/0186400 | A1 | 7/2012 | Elger |
| 2014/0262394 | A1 | 9/2014 | Scott et al. |
| 2014/0338504 | A1 | 11/2014 | Beer et al. |
| 2018/0111213 | A1 | 4/2018 | Mantes et al. |
| 2020/0061782 | A1 | 2/2020 | Banholzer et al. |
| 2021/0187723 | A1 | 6/2021 | Andersson |

FOREIGN PATENT DOCUMENTS

| | | | |
|---|---|---|---|
| JP | 2003-136418 | A | 5/2003 |
| JP | 2004-106161 | A | 4/2004 |
| JP | 2004-283980 | A | 10/2004 |
| JP | 2009-226511 | A | 10/2009 |

OTHER PUBLICATIONS

Sep. 11, 2018 Written Opinion issued in International Patent Application No. PCT/JP2018/027748.

Feb. 4, 2020 International Preliminary Report on Patentability issued in International Patent Application No. PCT/JP2018/027748.

Jan. 25, 2021 Office Action issued in Chinese Patent Application No. 201880048089.5.

Mar. 12, 2021 Office Action issued in Japanese Patent Application No. 2019-534063.

* cited by examiner

RATCHET WRENCH

RELATED APPLICATIONS

This Application is a Continuation Application of U.S. patent application Ser. No. 18/125,250, filed Mar. 23, 2023, which in turn is a Continuation Application of U.S. patent application Ser. No. 17/724,882, filed Apr. 20, 2022, which in turn is a Continuation Application of U.S. patent application Ser. No. 16/633,103, filed Jan. 22, 2020, which in turn claims the benefits of International Application No. PCT/JP2018/027748, filed on Jul. 24, 2018, which claims the benefit of Japanese Patent Application No. 2017-150941, filed on Aug. 3, 2017, the entirety of which is incorporated by reference.

TECHNICAL FIELD

The invention relates to an electric or air-driven ratchet wrench.

BACKGROUND ART

There has been known an electric ratchet wrench, which is also used manually, used to, for example, fasten a nut and a bolt as described in Japanese Laid Open Patent Publication No. 7-124871.

In the electric ratchet wrench, upper and lower end portions of a cylindrical socket rotatably supported to a distal end of a housing in a state where the socket is exposed on both upper and lower sides are held to a ratchet holder performing a reciprocating rotation operation. The socket has an outer peripheral surface where a sawtooth surface formed by arranging a ridge group having a mountain shape in cross section in parallel across the whole circumference is formed. Further, a ratchet claw that meshes with the sawtooth surface on the socket so as to allow a rotation in a free direction and restrict a rotation in a lock direction, which is a direction opposite to the free direction, is disposed outside the socket.

In the electric ratchet wrench, the reciprocating rotation operation by the ratchet holder in a state where the nut or the like is inserted into an upper half portion or a lower half portion of the socket progresses the fastening of the nut or the like via the socket. The action of the ratchet claw to the sawtooth surface intermittently progresses the fastening of the nut or the like in the lock direction each time the ratchet holder performs the reciprocating rotation operation, and the socket idles to the ratchet holder in the free direction.

DISCLOSURE OF THE INVENTION

Problems to be Solved by the Invention

With the above-described electric ratchet wrench, the meshing of the ratchet claw with the sawtooth surface on the socket achieves the lock direction and the free direction. Therefore, to improve strength of the lock, the ratchet claw and the sawtooth need to be increased in size, and there is a limit on achieving both compactability and a performance, such as the strength of lock and reliability of the operation.

Additionally, with the above-described electric ratchet wrench, the free direction and the lock direction are fixed. Accordingly, to switch these directions to the opposite directions substantially, it is necessary to reverse the electric ratchet wrench with respect to the nut or the like to change the insertion of the nut or the like from the inside of the lower half portion to the inside of the upper half portion of the socket or vice versa, requiring a lot of labor.

Additionally, with the above-described electric ratchet wrench, in a case where the nut or the like can be inserted only from the lower side due to, for example, a member being disposed on the upper side of the socket, the free direction and the lock direction cannot be switched to the opposite directions.

The main object of the invention is to provide a ratchet wrench achieving both compactability and a lock performance.

Additionally, the main object of the invention is to provide the ratchet wrench having further better operability regarding switching of a lock direction.

Further, the main object of the invention is to provide the ratchet wrench that performs the switching of the lock direction with more certainty.

Solutions to the Problems

An invention according to first aspect is a ratchet wrench that includes an electric or air-driven motor, a holder, and reciprocating motion conversion mechanism. The holder rotatably holds a tool bit or a tool bit holder via a one-way clutch mechanism. The reciprocating motion conversion mechanism is configured to convert a driving force from the motor into a reciprocating rotation motion of the holder. A space is provided between the tool bit or the tool bit holder and the holder. The space includes large interval portions and small interval portions. The small interval portions are adjacent to the large interval portions in a rotation direction of the tool bit or the tool bit holder. The small interval portions have distances smaller than distances of the large interval portions. The one-way clutch mechanism includes locking members disposed in the space. The locking member has a size equal to or less than the distance of the large interval portion and exceeding the distance of the small interval portion.

An invention according to second aspect, which is in the above-described invention, the locking member may include a pair of planar portions and a pair of bulge portions. The pair of planar portions may be arranged in a direction that the small interval portion is disposed viewed from the large interval portion. The pair of bulge portions may couple between end portions of the planar portions. A size between the pair of bulge portions may be equal to or less than the distance of the large interval portion and exceeding the distance of the small interval portion.

An invention according to third aspect, which is in the above-described invention, the pair of the planar portions may be parallel to one another.

An invention according to fourth aspect which is in the above-described invention, the pair of planar portions may have a posture of expanding toward the tool bit or the tool bit holder.

An invention according to fifth aspect, which is in the above-described invention, the locking member may be at least one ball.

An invention according to sixth aspect is a ratchet wrench that includes an electric or air-driven motor, a holder, and reciprocating motion conversion mechanism. The holder rotatably holds a tool bit or a tool bit holder via a one-way clutch mechanism. The reciprocating motion conversion mechanism is configured to convert a driving force from the motor into a reciprocating rotation motion of the holder. A space is provided between the tool bit or the tool bit holder and the holder. The space includes large interval portions and small interval portions. The small interval portions are adjacent to the large interval portions in a rotation direction of the tool bit or the tool bit holder. The small interval portions have distances smaller than distances of the large interval portions. The one-way clutch mechanism includes columnar or cylindrical locking members disposed in the space. The locking member has a diameter having a size equal to or less than the distance of the large interval portion and exceeding the distance of the small interval portion.

In an invention according to seventh aspect, which is in the above-described invention, the small interval portions may be disposed on both sides of the large interval portion. A retainer may be disposed between the tool bit or the tool bit holder and the holder. The retainer may be configured to change the spaces of the one small interval portion and the large interval portion to the spaces of another of the small interval portion and the large interval portion.

An invention according to eighth aspect, which is in the above-described invention, the retainer may include a protrusion. A direction switching lever including a cam portion in contact with the protrusion may be disposed on one of the holder and the tool bit or the tool bit holder.

An invention according to ninth aspect, which is in the above-described invention, in the retainer, springs that bias the locking member in a direction where the small interval portions are disposed viewed from the large interval portions may be disposed.

In an invention according to tenth aspect, which is in the above-described invention, a plurality of the spaces may be disposed in a state where arrangements of the small interval portions relative to the large interval portions in the rotation direction are similar to one another. The locking members may be disposed in the respective spaces.

In an invention according to eleventh aspect which is in the above-described invention, the tool bit or the tool bit holder may have an outer surface formed into a side surface shape of a regular polygonal prism. The holder may have an inner surface formed into a cylindrical surface shape.

Effects of the Invention

The main effect of the invention is to provide a ratchet wrench achieving both compactability and a lock performance.

Additionally, the main effect of the invention is to provide the ratchet wrench having further better operability regarding switching of a lock direction.

Further, the main effect of the invention is to provide the ratchet wrench that performs the switching of the lock direction with more certainty.

DESCRIPTION OF PREFERRED EMBODIMENTS

The following describes embodiments of the invention and their modification examples based on the drawings as necessary.

Front and rear, up and down, and right and left in the embodiments and the modification examples are defined for a convenience of explanation and may change according to a situation of a work, a state of a moving member, and the like.

It should be noted that the invention is not limited to the following embodiments and modification examples.

First Embodiment

Figure 1:
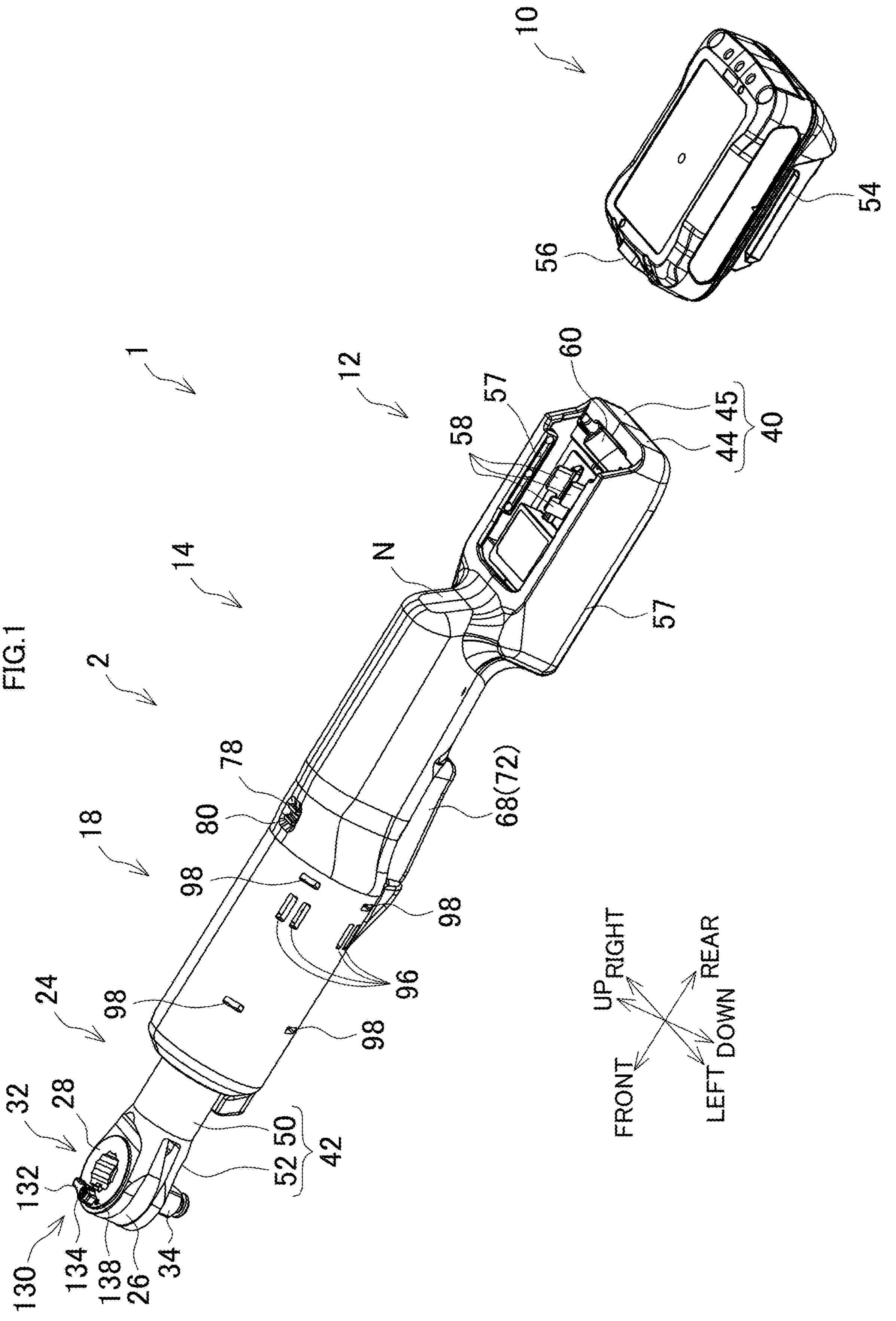
FIG. 1 is a perspective view of an electric ratchet wrench according to a first embodiment of the invention from an upper rear.
Figure 2:
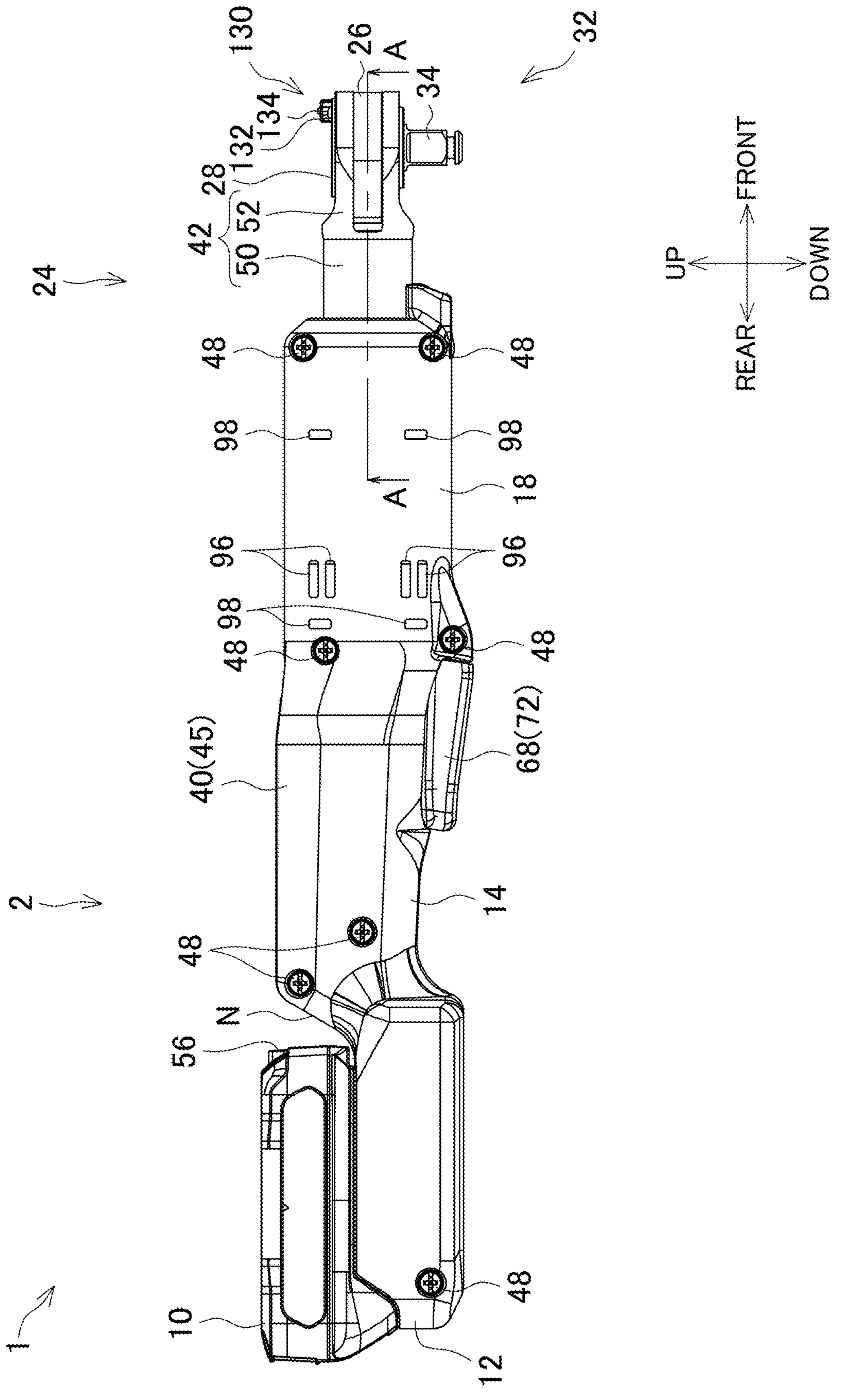
FIG. 2 is a right side view of FIG. 1.
Figure 3:
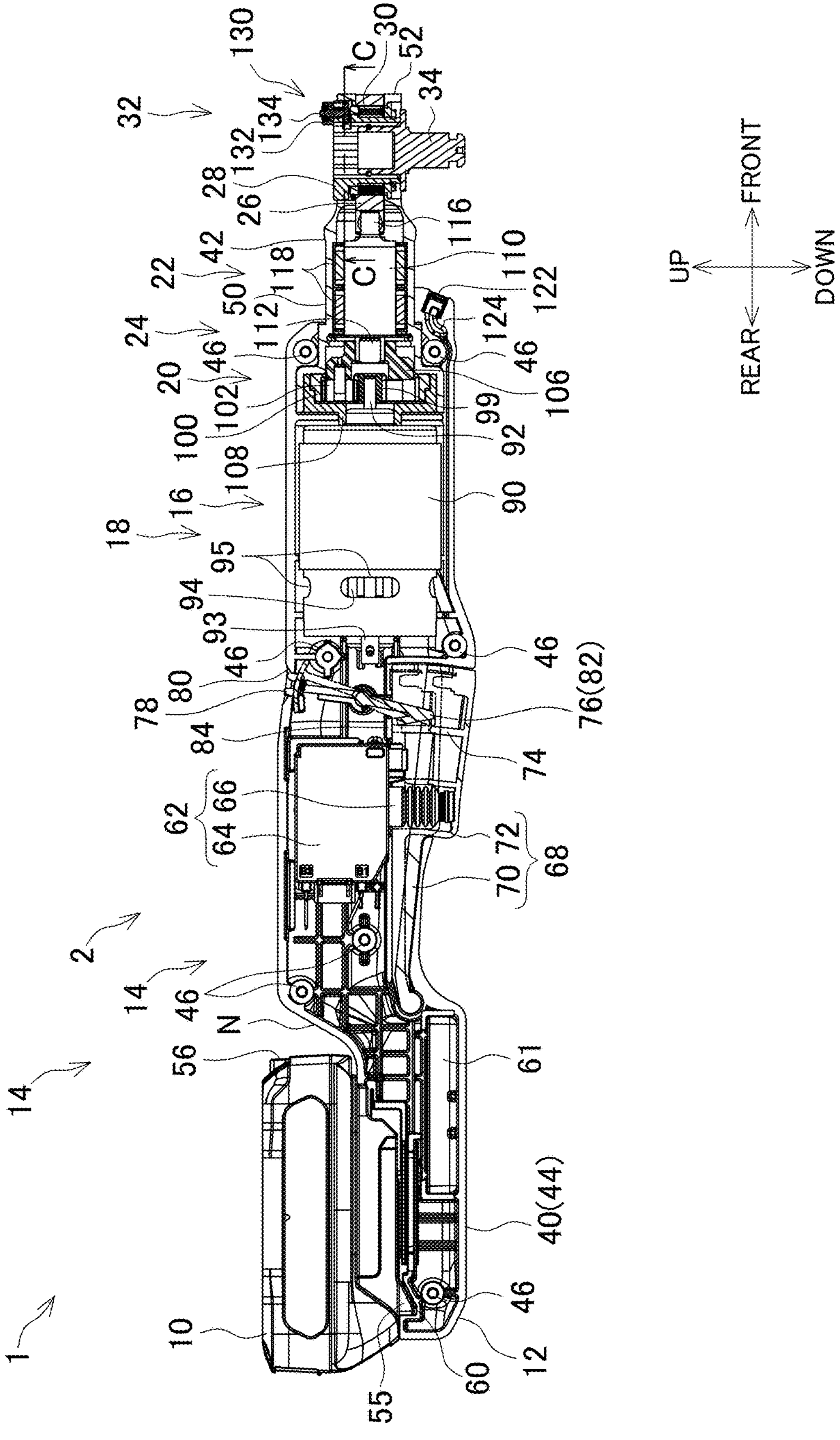
FIG. 3 is a center vertical cross-sectional view of FIG. 1.

FIG. 1 is an example of a straight type electric power tool and a perspective view of an electric ratchet wrench 1 according to the first embodiment of the invention, which is an example of a ratchet wrench, in a battery separated state from an upper rear. FIG. 2 is a right side view of the electric ratchet wrench 1 in a battery mounted state (the same applies to the following). FIG. 3 is a center vertical cross-sectional view (a battery 10, a controller 61, a switch 62, and a motor

Figure 4:
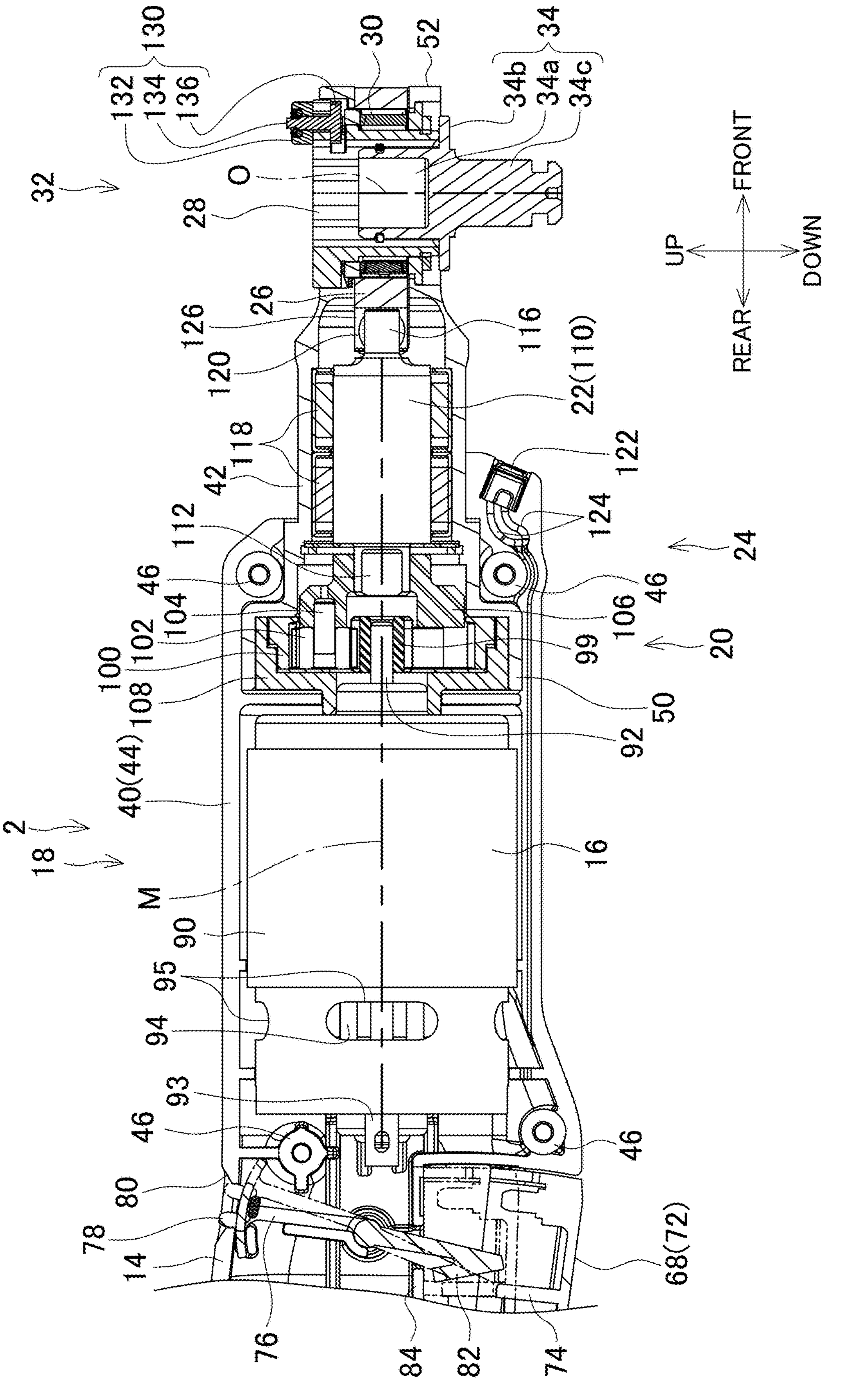
FIG. 4 is a partial enlarged view of FIG. 3.

16 are not in cross section) of the electric ratchet wrench 1. FIG. 4 is a partial enlarged view of FIG. 3.

The electric ratchet wrench 1 includes a housing 2 forming its casing.

The electric ratchet wrench 1 includes, in an order from a rear side to a front side, a battery mounting portion 12 to which the battery 10 is mounted, a handle portion 14 gripped by a user, a power unit 18 including the motor 16, a power transmission unit 24 including a planetary gear mechanism 20 and a spindle 22, and an output unit 32 including a holder 26 and a socket 28 and a one-way clutch mechanism 30 interposed between the holder 26 and the socket 28.

In the electric ratchet wrench 1, these main components (especially the motor 16, the planetary gear mechanism 20, and the spindle 22) are linearly arranged, serving as an electric power tool (straight type electric power tool) having one rod shape or an "I" shape as a whole.

The motor 16 is a driving source of the electric ratchet wrench 1. A rotation of the motor 16 is transmitted to the holder 26 in a state where deceleration and reciprocating motion conversion are performed by the planetary gear mechanism 20 and the spindle 22 as a power transmission mechanism, and the socket 28 as a tool bit holder slides to idle relative to the rotation of the holder 26 in a predetermined direction (free direction) via the one-way clutch mechanism 30. A rotation of the holder 26 in a lock direction, a direction opposite to the free direction, is output so as to lock and rotate together with the socket 28.

To the socket 28, a socket adapter 34 as a tool bit is mountable in a state where a direction of its center axis (output axis O) is in an up-down direction. The socket adapter 34 includes a hexagonal nut-shaped joint portion 34*a*, a flange portion 34*b* on a lower side of the joint portion 34*a*, and a quadrilateral driving portion 34*c* on a lower side of the flange portion 34*b*. The joint portion 34*a* is put into the socket 28. Various kinds of exchange sockets (not illustrated) are mounted to the quadrilateral driving portion 34*c*, which protrudes downward from the socket 28, and insertion of a bolt and a nut into the exchange socket, for example, fastens these components. The output axis O as a center axis from an upper end through a lower end of the socket adapter 34 or its extended line is in a direction (up-down direction) intersecting with a machine axis M in a front-rear direction as a center axis of the main components (especially the motor 16, the planetary gear mechanism 20, and the spindle 22) or its extended line, and protrudes downward in the quadrilateral driving portion 34*c*. Here, the machine axis M (or its extended line) and the output axis O (or its extended line) are orthogonal to one another.

Since the direction of the machine axis M intersects with the direction of the output axis O, the electric ratchet wrench 1 is a kind of an angle electric power tool. It should be noted that the exchange socket may be handled as the tool bit, and the socket adapter 34 may be handled as the tool bit holder.

The housing 2 includes a main body housing 40 and a gear housing 42. The main body housing 40 serves as a casing of the battery mounting portion 12, the handle portion 14, the power unit 18, and a rear half portion of the power transmission unit 24, and the gear housing 42 serves as a casing of the power transmission unit 24 and the output unit 32.

It should be noted that the arrangement of various kinds of members in the various kinds of housings and cases appropriately includes a case where a part of the member is in the housing and the case and the remaining part projects or is exposed from the housing and the case, in addition to a case where the members are completely in the housing and the case. Additionally, such an arrangement appropriately includes a case where the members are indirectly supported, in addition to a case where the members are directly supported to the housing and the case.

The main body housing 40 is laterally halved and includes a left main body housing 44 and a right main body housing 45. The left main body housing 44 includes a plurality of screw boss portions 46, and the right main body housing 45 includes screw-holes corresponding to the respective screw boss portions 46. The left main body housing 44 and the right main body housing 45 are mated with a plurality of screws 48 each inserted into the pair of the screw-hole and the screw boss portion 46.

The gear housing 42 is a loupe-shaped member made of metal. A handle-shaped portion 50 at the rear of the loupe-shaped portion has a cylindrical shape and has a front diameter-expanded portion having an expanded diameter and a rear diameter-expanded portion having a further expanded diameter at its rear portion. Additionally, a frame-shaped portion 52 at a front portion of the loupe-shaped portion has a forked shape that projects from the front portion of the handle-shaped portion 50 to expand forward like a trumpet shape and further each project forward from the top and the bottom, and each projection has a rounded frame.

The handle-shaped portion 50 has a rear portion interposed into a front end portion of the main body housing 40, and thus the gear housing 42 is coupled to the main body housing 40. The diameter-expanded portions (especially the rear diameter-expanded portion) of the handle-shaped portion 50 avoid the gear housing 42 to come off forward.

The battery 10 is a 10.8V (bolt) lithium-ion battery that contains eight cells as rechargeable cells (not illustrated) in a rectangular parallelepiped-shaped battery case made of resin. The cell has a columnar shape long in an axis direction and directed in a longitudinal direction of the battery case. The battery 10 is rechargeable, and the electric ratchet wrench 1 is a rechargeable ratchet wrench.

The battery 10 has a plurality of groove portions (not illustrated) extending in the longitudinal direction formed on one surface (wide surface) of the battery case. In each groove portion, a battery terminal electrically coupled to the cell is disposed to be exposed in the groove portion. It should be noted that the battery terminal is not limited to be installed in the groove portion and, for example, may project or be biased during mounting.

Additionally, a microcomputer (not illustrated) is built into the battery 10. The microcomputer controls an operation of the battery 10, such as a supply of electric power from the cell to the battery terminal.

Groove-shaped rail guides 54 having a longitudinal direction in the front-rear direction are disposed on right and left of the battery case of the battery 10 when the battery terminals are faced downward.

Additionally, the battery 10 includes a battery claw 55 configured to project in a state of being biased from an installation surface in a projection direction on a side edge of the installation surface of the battery terminals. The battery claw 55 is integrated with a battery lever (not illustrated) disposed on a surface adjacent to the installation surface of the battery terminals and a surface close to the battery claw 55. An operation of the battery lever allows the battery claw 55 to sink into the battery case against a biasing force.

Further, the battery 10 includes a battery state display unit 56 and a button (not illustrated). The battery state display unit 56 displays a state of the battery 10, such as an amount of charge (remaining capacity) of the battery 10, on a surface on a side opposite to the battery lever. The battery state display unit 56 includes a plurality of (four) lamps (not illustrated) arranged in the longitudinal direction on the installation surface. When the button is pressed, the microcomputer lights up the lamps by the number according to the current remaining capacity in the battery state display unit 56 from one end side for a predetermined period. Additionally, when the remaining capacity is equal to or less than a predetermined threshold and therefore the charging is required, the microcomputer flashes one lamp on the one end side of the battery state display unit 56 for a predetermined period. Further, when the battery 10 has a failure, such as a current value between the cell and the battery terminal in excess of a predetermined threshold, the microcomputer flashes two lamps on one end side and two lamps on the other end side in alternation.

It should be noted that the battery state display unit 56 is variously changeable. The battery state display unit 56 may be a seven-segment type display unit, the button may be omitted and the display may be performed, for example, while the battery 10 is mounted, at least one of the flash display for charging and the failure display may be omitted, the display may be continued until the button is pressed again or a second button disposed separately is pressed, another state of the battery may be displayed, or the battery state display unit 56 may be entirely omitted.

At least any of the installation position of the battery terminal, the installation position of the battery lever, and the installation position of the battery state display unit 56 is variously changeable. For example, the battery lever and the battery state display unit 56 are each disposed on an identical surface so as not to be disposed on opposed surfaces.

The battery mounting portion 12 is formed at the rear portion of the main body housing 40 and has a flat plate portion expanding into a flat plate shape from front to back and from side to side. The flat plate portion of the battery mounting portion 12 has a depressed portion depressed downward from its top surface. The flat plate portion, which occupies the most part of the battery mounting portion 12, is put to one side, which is the lower side, with respect to the above-described extended line of the machine axis M, and the battery mounting portion 12 has a front end portion having a staged surface N expanding from side to side and up and down (in further detail, obliquely upward to the front).

The battery mounting portion 12 includes rail portions 57 in the front-rear direction disposed right and left of the upper portion of the depressed portion, a plurality of terminals 58 projecting upward from a bottom surface of the depressed portion and extending in the front-rear direction, and a hollow 60 formed to be further depressed downward at the rear portion of the depressed portion. It should be noted that the depressed portion of the battery mounting portion 12 may be disposed at a part other than one surface of the flat plate portion, such as a top surface of a semicolumnar portion having a flat top surface and a curved lower surface.

The controller 61 is disposed below the terminals 58 in the battery mounting portion 12. The controller 61 is held by front and rear ribs formed on an inner surface of the main body housing 40. The respective terminals 58 and the controller 61 are electrically coupled to one another with a lead wire (not illustrated).

The battery 10 is slid forward from the rear of the battery mounting portion 12 in a state where the battery lever is on the rear side and the installation surface of the battery terminals are on the lower side, thus being mounted to the battery mounting portion 12.

At this time, the rail portions 57 in the battery mounting portion 12 enter the rail guides 54 on the battery 10 to guide the battery 10. It should be noted that rail portions may be disposed in the battery 10 and rail guides may be disposed in the battery mounting portion 12, or rail portions and rail guides may be omitted.

The corresponding terminals 58 enter the respective groove portions on the battery 10, and at the completion of mounting, the battery terminals inside the groove portions contact the terminals 58.

Further, the battery claw 55 of the battery 10 enters the hollow 60 at the completion of mounting, and thus the battery 10 is reliably held in the battery mounting portion 12. Additionally, when the user operates the battery lever to retreat the battery claw 55 from the hollow 60, the battery 10 is removable from the battery mounting portion 12 by sliding to the rear.

In addition, a clearance is generated between the battery state display unit 56 on the front surface of the battery 10 and the staged surface N of the battery mounting portion 12. Accordingly, the button on the battery state display unit 56 is easily operated and the display in the battery state display unit 56 is easily seen. Additionally, by gripping the front portion of the battery 10, the battery 10 is easily removed from the battery mounting portion 12.

The switch 62 is disposed on the handle portion 14.

The switch 62 includes a switch main body 64 and a plunger 66 that projects downward from the switch main body 64 in a state whose amount of projection is changeable.

While an external force does not act, the plunger 66 is biased downward so as to be a predetermined maximum amount of projection, and when receiving the action, the plunger 66 moves upward to reduce the amount of projection.

The switch main body 64 changes a switching state according to the amount of projection of the plunger 66. Here, when the amount of projection decreases from the maximum amount of projection by a predetermined amount or more and the plunger 66 moves upward from the predetermined switching position, the switch main body 64 (switch 62) switches on from off, and the switch 62 switches off from on in the reverse situation.

The switch 62 is electrically coupled to the controller 61 via a lead wire (not illustrated).

A paddle-shaped lever 68 is disposed below the switch 62.

The lever 68 includes an arm portion 70 and a bus tab-shaped button portion 72 bulging downward.

Pins are stood on right and left of a rear end portion of the arm portion 70 so as to project outward in the right-left direction, and supporting the arm portion 70 by the main body housing 40 allows the lever 68 to rotate around the pins. Supporting the lower surface of the arm portion 70 to the inner surface of the main body housing 40 sets the lever 68 at a lowest position. The plunger 66 contacts the top surface of the rear portion of the button portion 72. At the center of the button portion 72, a rib 74 projecting upward is integrally formed. The button portion 72 is exposed in the lower portion of the main body housing 40.

A lock arm 76 is disposed in front of the switch 62 and at the rear of the motor 16.

The lock arm 76 is a member extending up and down. Pins are stood on right and left of the center of the lock arm 76 so as to project outward in the right-left direction. Entering the pins into the cylindrical bosses formed in the inner surface of the main body housing 40 allows the lock arm 76 to rotate around the pins.

On an upper end portion of the lock arm 76, a slider 78 having a small protrusion shape is disposed to project upward. The slider 78 is exposed from a hole 80, which is provided in an upper portion of the main body housing 40.

The lock arm 76 has a lower end portion formed as an arrowhead-shaped portion 82 having an arrowhead shape.

When the user operates the slider 78 to be positioned forward, the lock arm 76 has an inclined posture downward to the rear, and a lower end portion of the arrowhead-shaped portion 82 is adjacent to the upper end portion of the rib 74 of the lever 68. In this state, even when the button portion 72 of the lever 68 is pressed upward, the rib 74 abuts on the arrowhead-shaped portion 82 to hold back upward movements of the button portion 72 and the plunger 66 and to block the switching of the switch 62 to the on-state (off-lock state). A rib 84 in contact with the upper end portion of the arrowhead-shaped portion 82 in the off-lock state is disposed to project inward from the inner surface of the main body housing 40 on the upper side of the arrowhead-shaped portion 82. The rib 84 holds back the upward movement of the arrowhead-shaped portion 82 to reliably block the upward movements of the button portion 72 and the plunger 66.

Meanwhile, when the slider 78 is operated to be positioned rearward, the lock arm 76 has an approximately perpendicular posture and the arrowhead-shaped portion 82 is away from a space immediately above the rib 74 of the lever 68 and the rib 84. Pressing the button portion 72 of the lever 68 in this state rotatably moves the lever 68 upward, the plunger 66 is pressed, and the switch 62 is switched to the on-state (off-lock released state).

Since only the switch 62 and the lock arm 76 are disposed inside the handle portion 14 and the motor 16 and the battery 10 are not disposed, the handle portion 14 can be formed to be further thinned and can be formed in a state further easily gripped by the user.

The motor 16 is a DC motor with brush and disposed in the front portion of the main body housing 40.

The motor 16 includes a cylindrical motor case 90, a motor shaft 92 in the front-rear direction, and a motor terminal 93. The motor shaft 92 is disposed so as to penetrate the motor case 90 on its center axis and is rotatably driven around the center axis of itself. The motor terminal 93 projects rearward from the rear portion of the motor case 90. The motor 16 is electrically coupled to the controller 61 via the motor terminal 93 with a lead wire (not illustrated).

The controller 61 controls driving of the motor 16 and controls the rotation of the motor shaft 92 in the motor 16. When a current equal to or more than a predetermined threshold is detected, the controller 61 grasps the unintended lock state of the motor shaft 92 and stops the driving of the motor 16.

Additionally, the motor 16 includes a fan 94 integrally mounted with the motor shaft 92. The fan 94 is disposed inward a plurality of exhaust outlets 95, which are circumferentially arranged in the motor case 90. A plurality of exhaust outlets 96 are opened in parts positioned circumferentially outward the exhaust outlets 95 in the main body housing 40. It should be noted that the fan 94 may be disposed separately from the motor 16 or may be omitted.

Meanwhile, a plurality of air inlets 98 are opened at the front and rear of the exhaust outlets 96 in the main body housing 40. The respective air inlets 98 are disposed at the front and rear of the motor 16. A pinion gear 99 is fixed to the distal end portion of the motor shaft 92 integrally with the motor shaft 92.

The planetary gear mechanism 20 as a deceleration mechanism includes a ring-shaped internal gear 100 having internal teeth, a plurality of (three) planetary gears 102 having external teeth meshing with the internal gear 100, pins 104 as shafts for the respective planetary gears 102, and a carrier 106 holding all (three) pins 104.

The internal gear 100 is unrotatably mounted into a rear diameter-expanded portion of the gear housing 42 via a gear retainer 108. The gear retainer 108 extends from the inside of the rear diameter-expanded portion of the gear housing 42 to the inside of the front end portion of the main body housing 40.

The planetary gears 102 are each disposed inward the internal gear 100.

Each pin 104 has a columnar shape having its front-rear direction in the axis direction.

The respective planetary gears 102 are supported to the pins 104 in a state rotatable around the corresponding pin 104.

The carrier 106 is a ring-shaped member having a small-diameter portion on a front side of a large-diameter portion. The large-diameter portion of the carrier 106 has holes supporting the front portions of the pins 104. The planetary gears 102 are disposed on the rear portions of the respective pins 104. The pins 104 and the planetary gears 102 are circumferentially disposed at regular intervals. The pinion gear 99 meshes with each planetary gear 102. The front end portion of the pinion gear 99 enters the inside of the large-diameter portion of the carrier 106. The carrier 106 is disposed rotatable around an axis of itself in the front-rear direction inside a front diameter-expanded portion of the gear housing 42.

The spindle 22 as a reciprocating motion conversion mechanism is a columnar member running along the front-rear direction and includes a spindle main body portion 110, a coupling portion 112, and a columnar eccentric pin 116. The coupling portion 112 is concentric with the spindle main body portion 110 and projects rearward from a rear surface of the spindle main body portion 110 in a state where the cross-sectional surface has a non-rotation symmetrical shape (oval shape) viewed at the center. The eccentric pin 116 projects forward from the front surface of the spindle main body portion 110 in an eccentric state from the center axis of the spindle main body portion 110.

The spindle main body portion 110 is rotatably supported by front and rear bearings (needle bearings) 118 fixed inside the front portion of the gear housing 42 around the center axis in the front-rear direction. The center axis of the spindle main body portion 110, the center axis of the planetary gear mechanism 20, and the center axis of the motor shaft 92 match, becoming the machine axis M of the electric ratchet wrench 1.

The coupling portion 112 enters an inner hole of the small-diameter portion of the carrier 106 having a cross-sectional shape identical to the coupling portion 112 and is coupled so as to integrally rotate with the carrier 106.

The eccentric pin 116 is covered with a barrel-shaped sleeve 120 rotatable around the eccentric pin 116.

A light 122 is disposed under the spindle 22.

The light 122 is an LED and is entered in a depressed portion formed in a lower portion at the front end of the main body housing 40. A wiring groove 124 to put a lead wire (not illustrated) of the light 122 is formed at the rear of the depressed portion in the main body housing 40. The light 122 is electrically coupled to the controller 61 via the lead wire.

The light 122 is disposed to face a front lower side to illuminate around a lower side of the quadrilateral driving portion 34*c* of the socket adapter 34.

The holder 26 is a ring-shaped member made of metal having an inner diameter slightly smaller than an inner diameter of the frame-shaped portion 52 of the gear housing 42 and disposed between an upper portion and a lower portion of the frame-shaped portion 52. The holder 26 is rotatably disposed around a center axis in the up-down direction of its round hole. The holder 26 expands from front to back and from side to side, and the extended line of the machine axis M passes through a center between top and bottom surfaces (thickness) of the holder 26 and is perpendicular to the center axis in the up-down direction of its round hole. It should be noted that the machine axis M may be grasped including the holder 26 (output unit 32), and in this case, the machine axis M is from the front end portion of the holder 26 to the rear end portion of the motor shaft 92.

The rear portion of the holder 26 reaches an inside of a front end portion of the handle-shaped portion 50 of the gear housing 42 and includes a vertical groove 126 having a semi-cylindrical surface shape having an up-down direction in the axis direction.

The sleeve 120 and the eccentric pin 116 enter an inside of the vertical groove 126, and right and left of the sleeve 120 contact the vertical groove 126. The rotation of the spindle 22 rotates the eccentric pin 116 and the sleeve 120 in the eccentric manner, and the movements of the portions in the right-left direction are transmitted to the holder 26 via the vertical groove 126 by pressing the vertical groove 126 with the sleeve 120. Additionally, the movements of the portions in the up-down direction are performed in the vertical groove 126 and are not transmitted to the holder 26. The movements in the up-down direction are smoothly performed by the rotation of the sleeve 120 around an eccentric pin 116. Thus, the rotation of the spindle 22 is converted into reciprocating motions to the right and left, and the reciprocating motions are transmitted to the holder 26.

A tubular socket 28 is entered into the hole of the holder 26 and the hole of the frame-shaped portion 52 of the gear housing 42 overlapping with the hole of the holder 26 via the one-way clutch mechanism 30.

In an inner hole in the up-down direction of the socket 28, 12 nut corner contact grooves in which six corners of a hexagonal nut can be entered are formed extending up and down.

A direction switching lever 130 that switches the free direction and the lock direction of the one-way clutch mechanism 30 is disposed on the front upper portion of the socket 28. It should be noted that the direction switching lever 130 may be disposed in the holder 26.

The direction switching lever 130 includes a rod-shaped operating unit 132 exposed on the top surface of the socket 28, a shaft portion 134 that projects downward from one end part of the operating unit 132, and a cam portion 136 that projects from the lower end portion of the shaft portion 134 in a direction opposite to the operating unit 132. The shaft portion 134 is disposed at the center on the upper portion of the socket 28. Depressed portions 138 are formed on right and left on the top surface of the socket 28, and a projecting portion 139 (see FIG. 11) into which the depressed portion 138 can be entered is formed on the lower surface of the other end part of the operating unit 132. It should be noted that the projecting portion 139 may be formed in the socket 28, the depressed portion 138 may be formed in the direction switching lever 130, or a lock portion and a locked portion according to another aspect may be formed.

When the operating unit 132 is disposed in a state where the projecting portion 139 enters one depressed portion 138, by an action of the cam portion 136, the one-way clutch mechanism 30 allows the socket 28 to rotate so as to relatively slide to the holder 26 in the predetermined direction (free direction) and holds back the rotation of the socket 28 to the holder 26 in the opposite direction (lock direction) to integrally rotate the socket 28 and the holder 26. When the operating unit 132 is operated from this state to a state where the projecting portion 139 enters the other depressed portion 138, the direction switching lever 130 rotates around the shaft portion 134, the cam portion 136 rotates and changes its posture, and the one-way clutch mechanism 30 switches the direction between the above-described free direction and lock direction. It should be noted that even when the ratchet mechanism using the gear and the claw is not used, since the electric ratchet wrench 1 operates similarly to a wrench using the ratchet mechanism as long as the free direction and the lock direction, which is the direction opposite to the free direction, are present like the one-way clutch mechanism 30, the electric ratchet wrench 1 may be referred to as a ratchet wrench.

The socket adapter 34 is mounted from the lower side of the socket 28. It should be noted that the user may insert a nut or the like into the socket 28 in a state where the socket adapter 34 is not mounted and may fasten the nut or the like.

The following further describes the one-way clutch mechanism 30 in detail.

Figure 5:
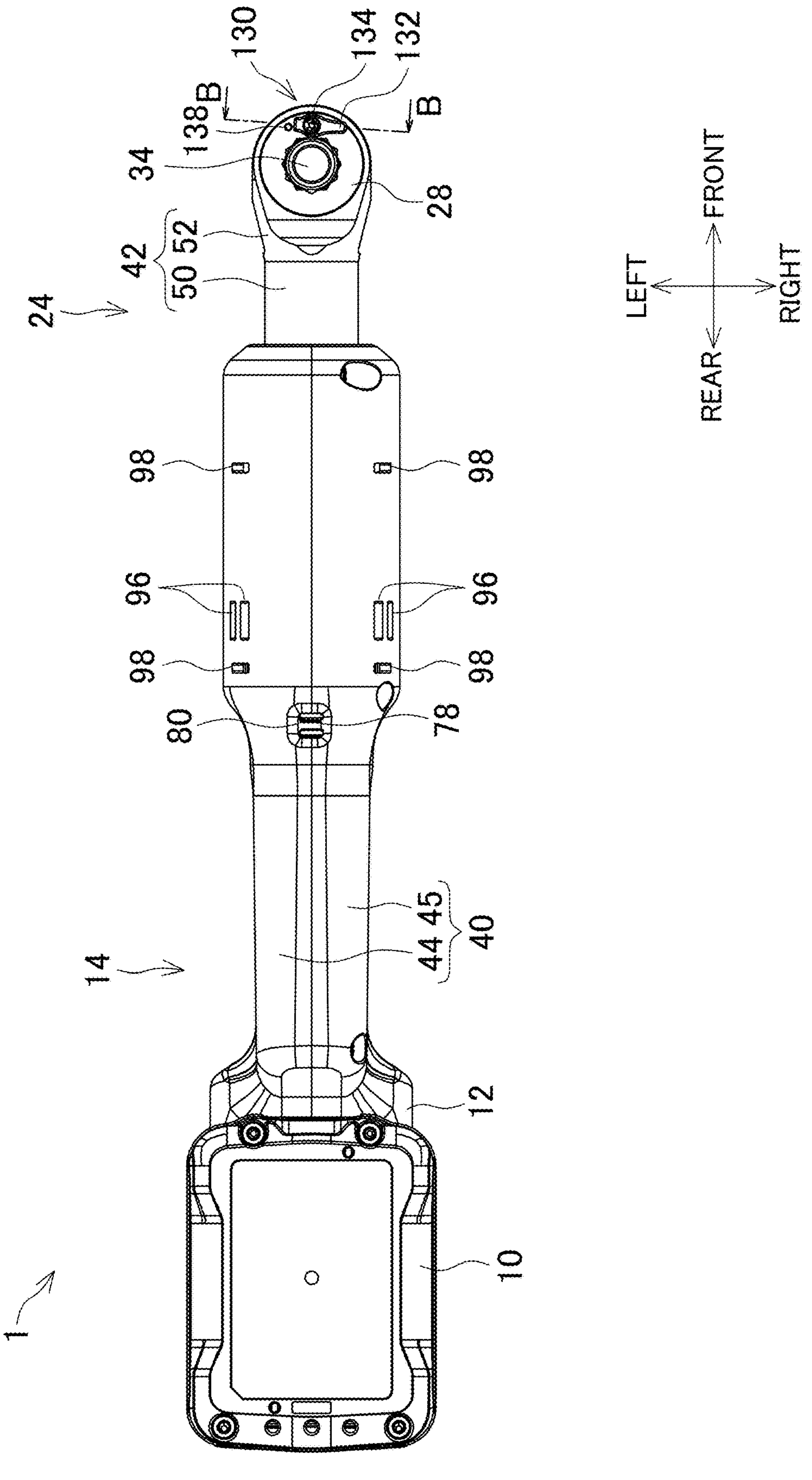
FIG. 5 is a top view of FIG. 1.
Figure 6:
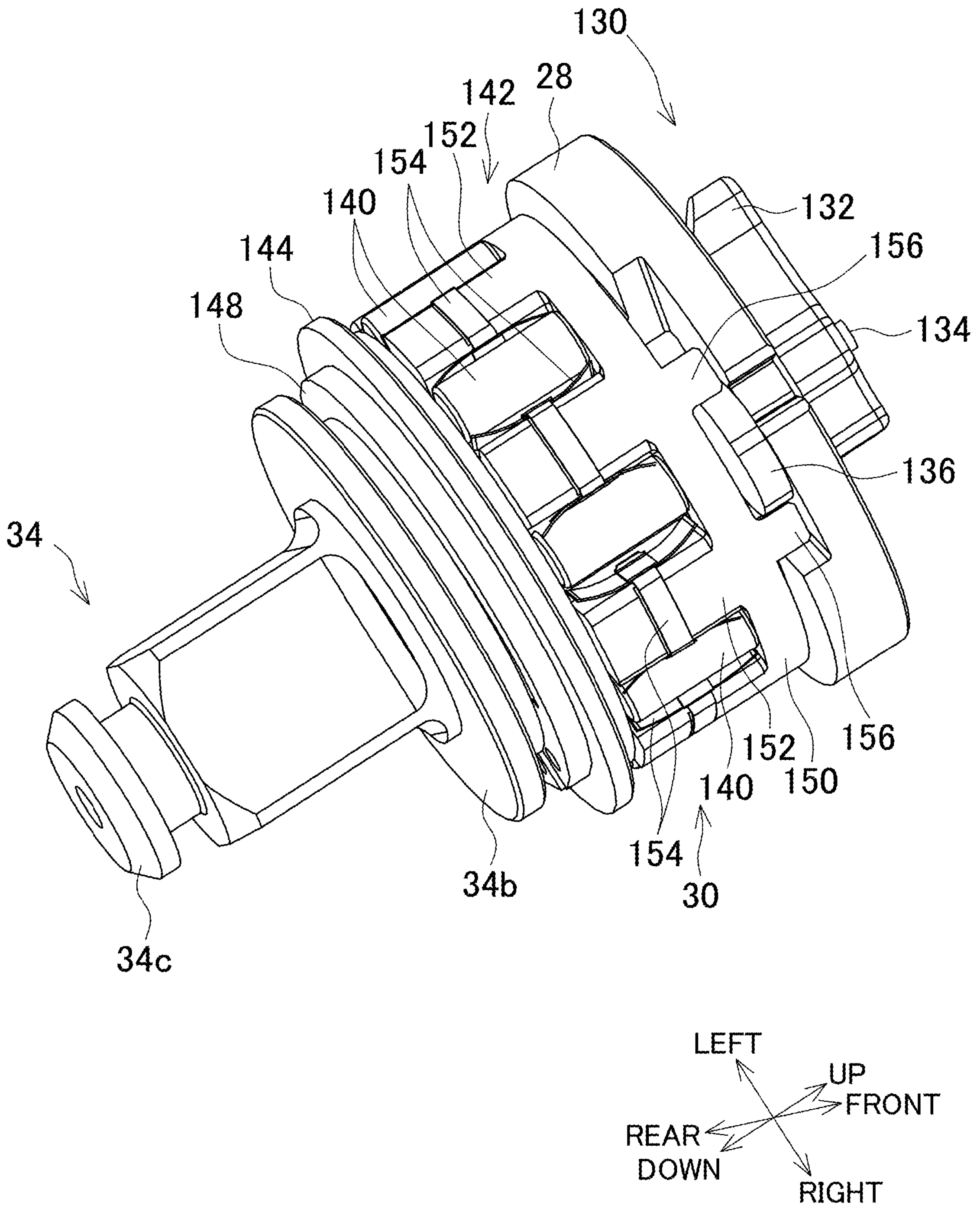
FIG. 6 is a perspective view of a one-way clutch mechanism of FIG. 1 and its peripheral area.
Figure 7:
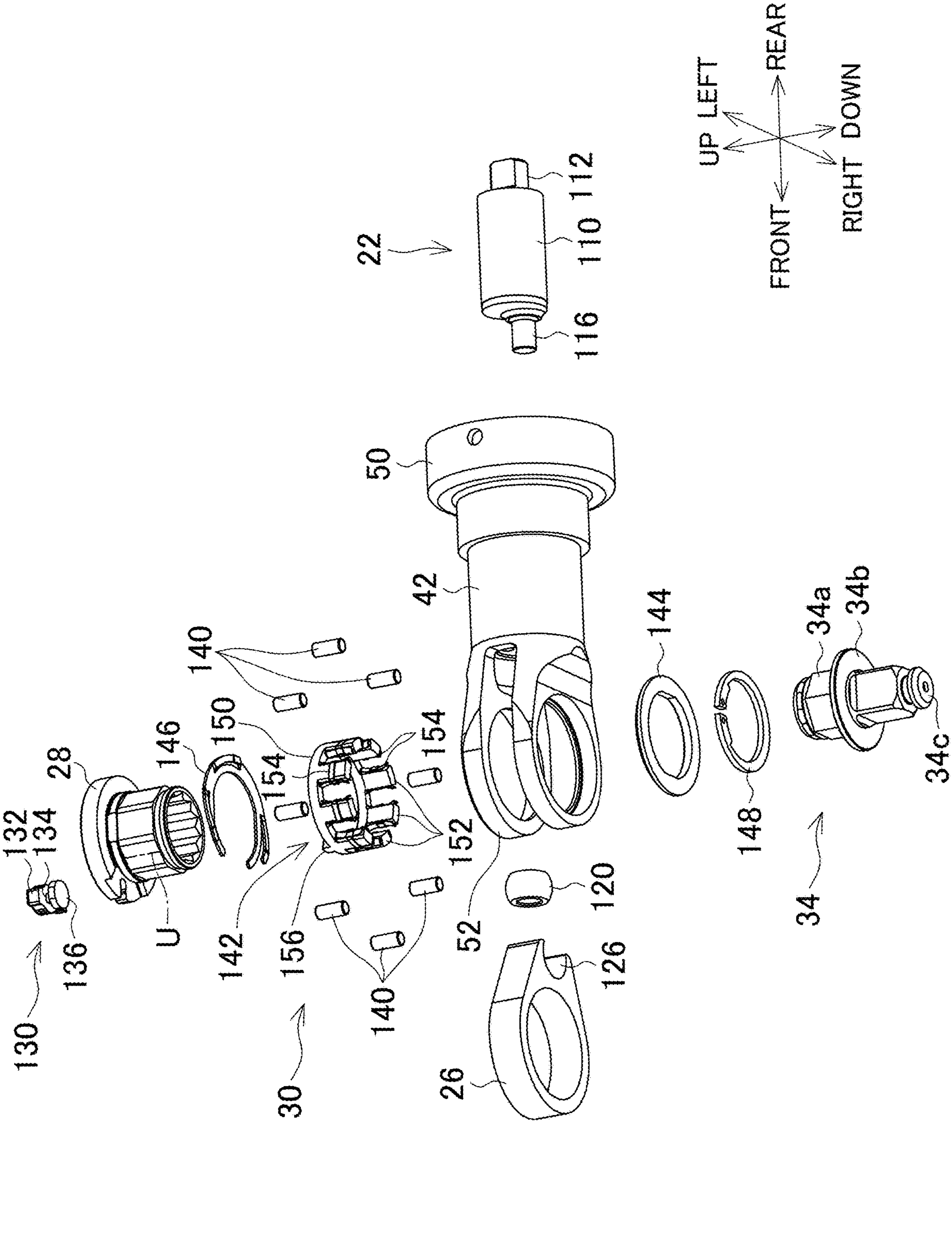
FIG. 7 is an exploded perspective view of FIG. 6 and its peripheral area viewed from a left lower side.
Figure 8:
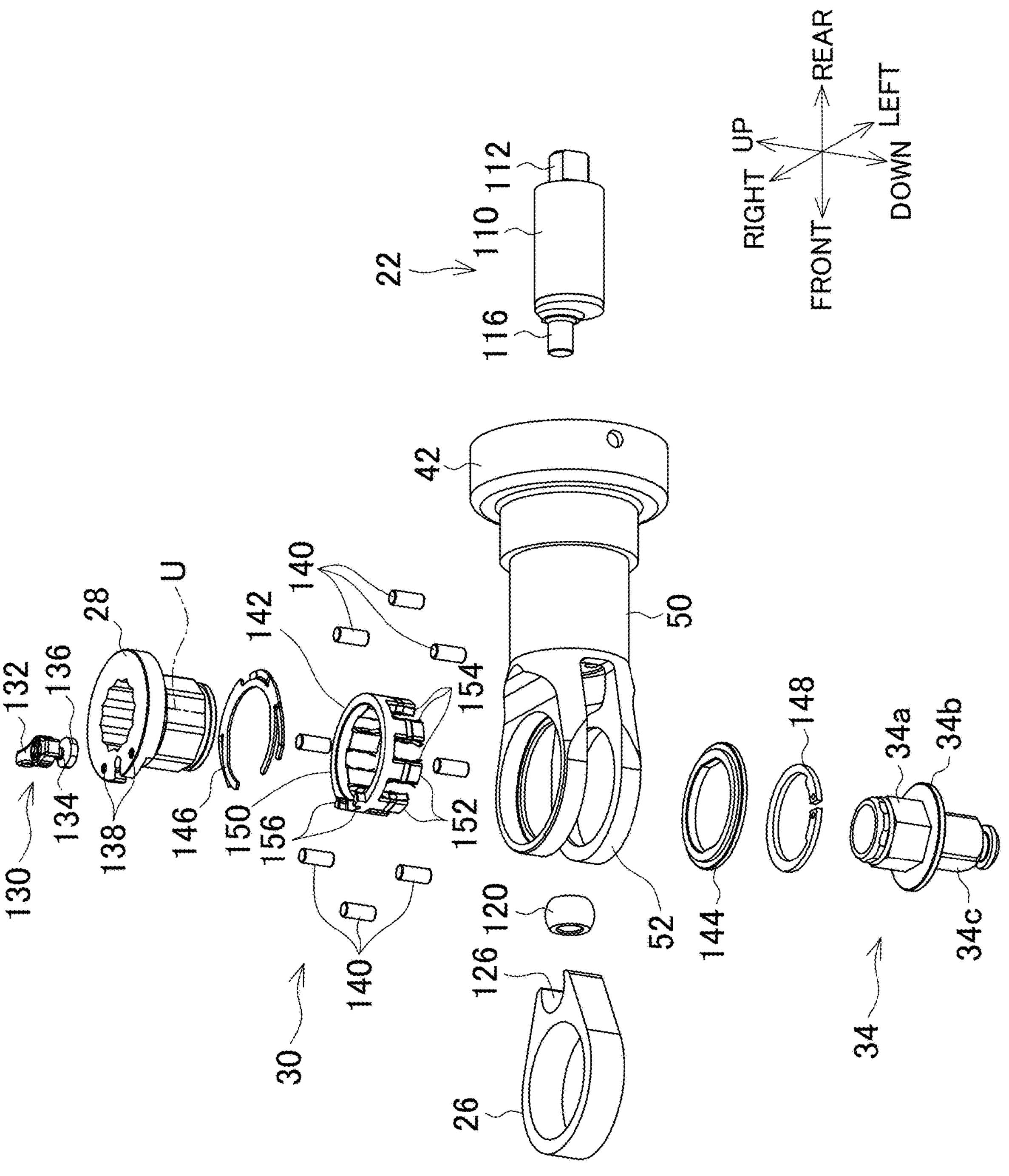
FIG. 8 is an exploded perspective view of FIG. 6 and its peripheral area viewed from a left upper side.
Figure 9:
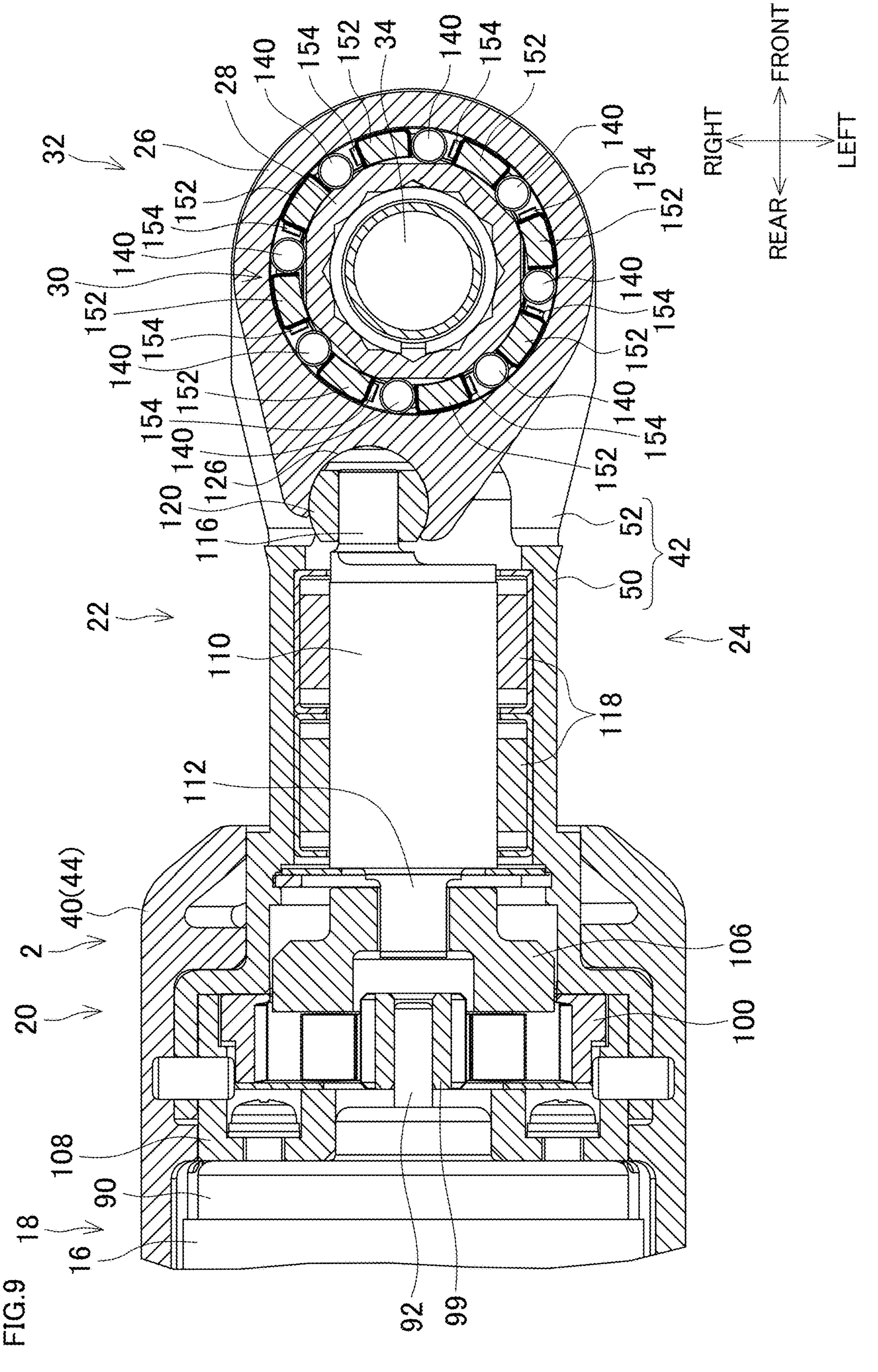
FIG. 9 is a cross-sectional view taken along the line A-A of FIG. 2.
Figure 10A:
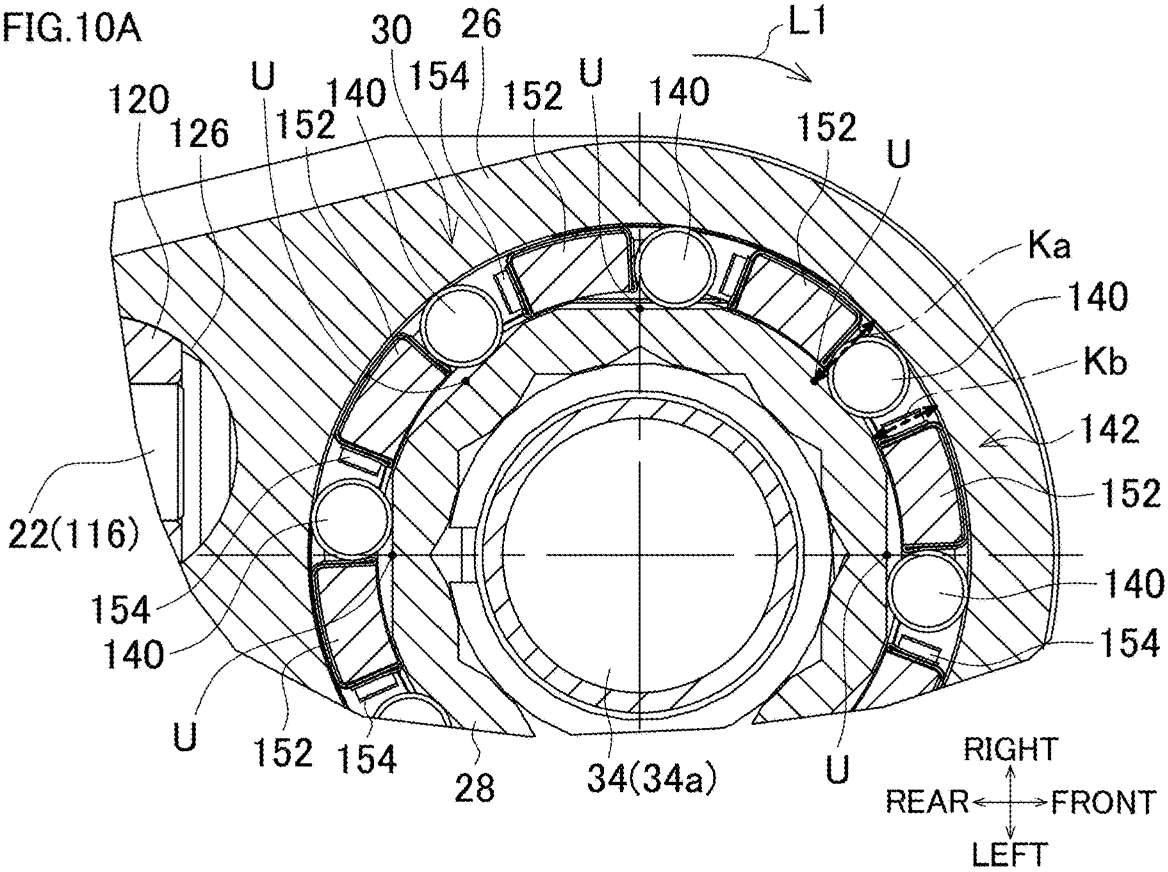
FIG. 10A is an enlarged view of a front right portion of FIG. 9 and a drawing when an operating unit of a direction switching lever is on a right side.
Figure 10B:
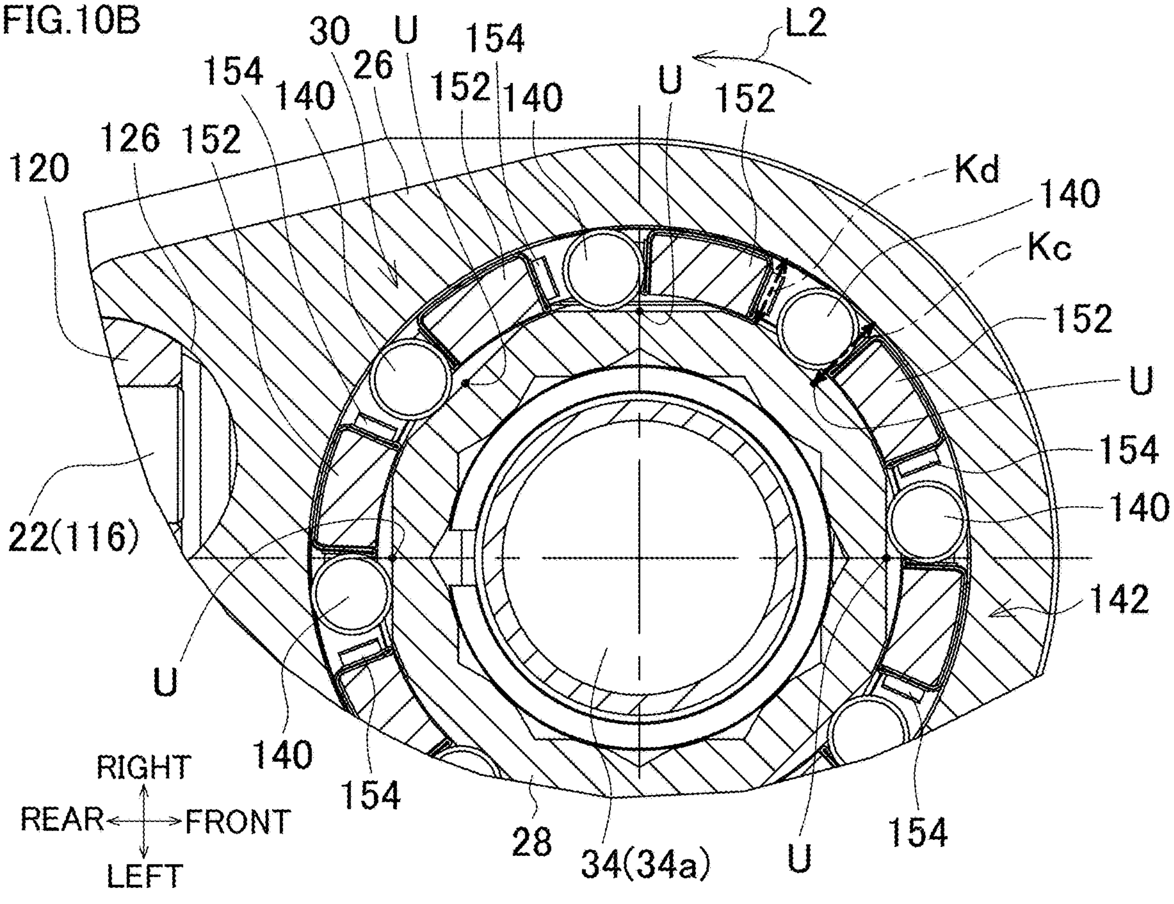
FIG. 10B is an enlarged view of a front right portion of FIG. 9 and a drawing when an operating unit of a direction switching lever is on a left side.
Figure 11:
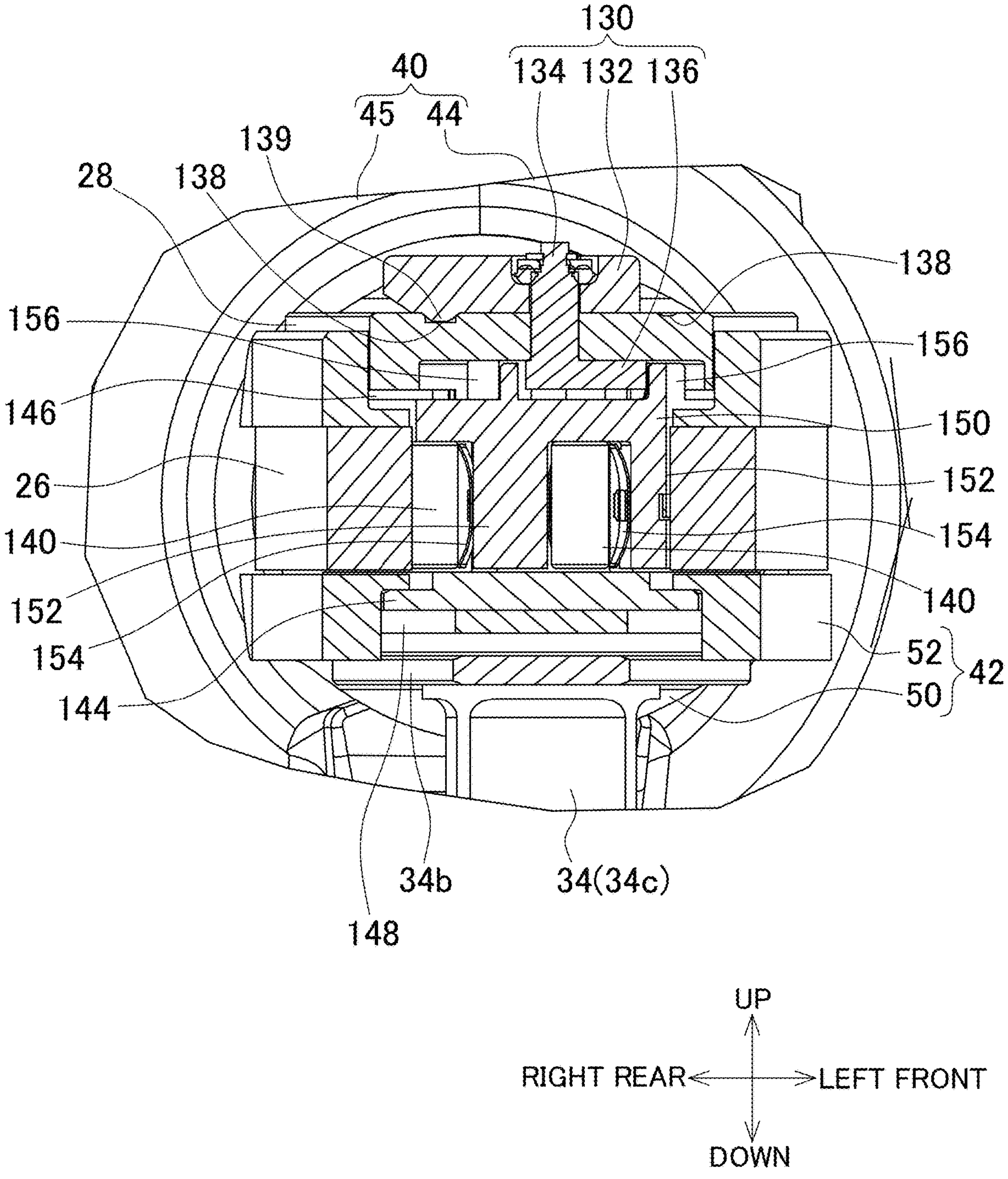
FIG. 11 is a cross-sectional view taken along the line B-B of FIG. 5.
Figure 12:
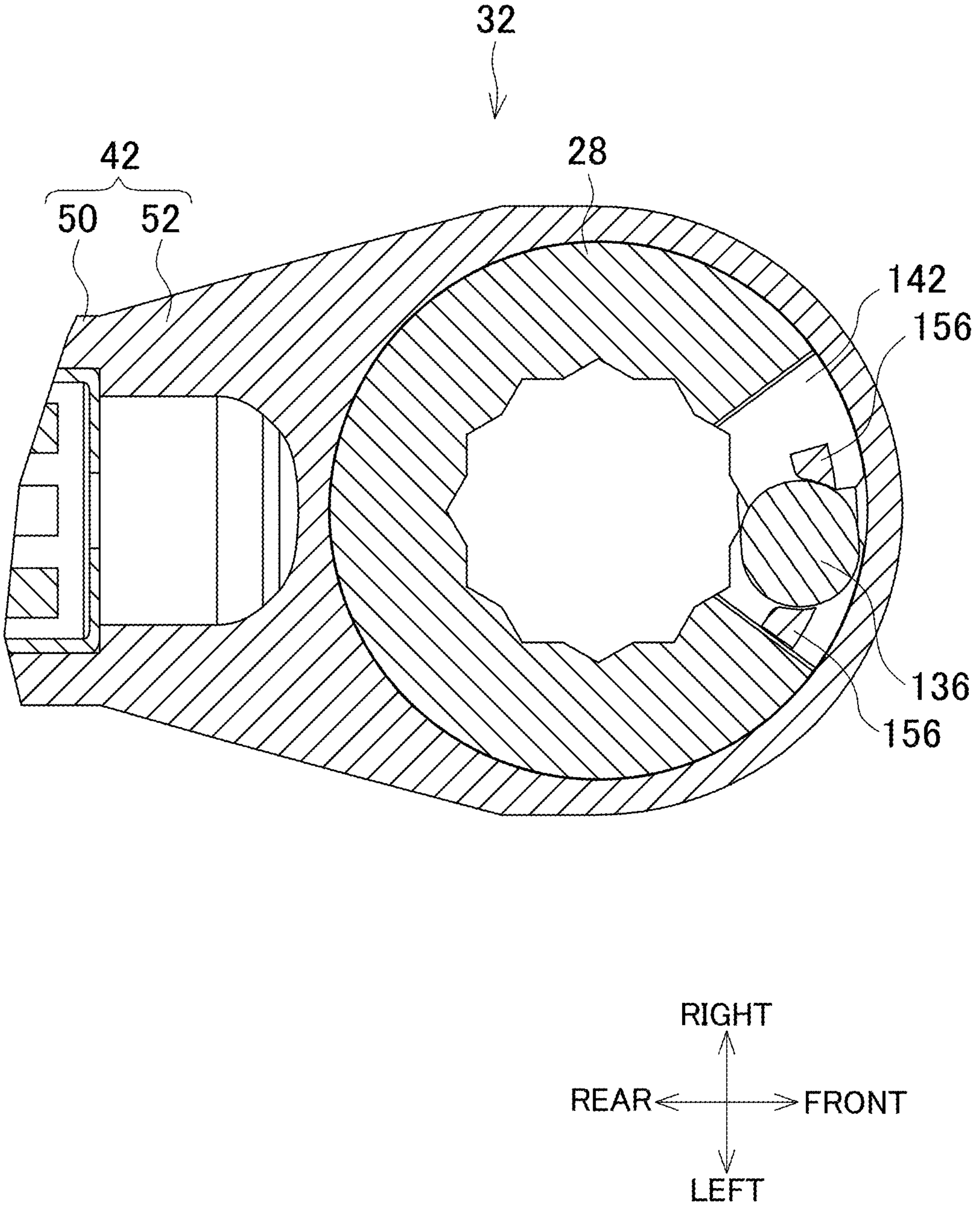
FIG. 12 is a cross-sectional view taken along the line C-C of FIG. 3.

FIG. 5 is a top view of the electric ratchet wrench 1, FIG. 6 is a perspective view of the one-way clutch mechanism 30 and the socket 28 and the socket adapter 34, FIG. 7 and FIG. 8 are exploded perspective views of FIG. 6, and the holder 26, the spindle 22 and the gear housing 42, FIG. 9 is a cross-sectional view taken along the line A-A of FIG. 2, FIG. 10 is an enlarged view of a front right portion of FIG. 9, FIG. 11 is a cross-sectional view taken along the line B-B of FIG. 5, FIG. 12 is a cross-sectional view taken along the line C-C of FIG. 3, and FIG. 13 is an enlarged view of a front portion of FIG. 12.

The one-way clutch mechanism 30 includes a plurality of (eight) locking pins 140, a retainer 142 and a ring 144 that hold the locking pins 140, an upper C-shaped ring 146 and a lower C-shaped ring 148 disposed above and below the retainer 142 and the ring 144, and the above-described direction switching lever 130.

The locking pins 140 as locking members each have a columnar shape and has a size identical to one another. It should be noted that at least one locking pin 140 may have a hollow columnar shape or a cylindrical shape.

The retainer 142 is a crown-shaped member and includes a ring-shaped base portion 150 on the upper portion, eight projections 152 projecting downward from the base portion 150, and springs 154 as elastic bodies mounted to the respective projections 152.

Right and left pair of protrusions 156 projecting upward are formed on the top surface at the front portion of the base portion 150. An installation part of the direction switching lever 130 in a front portion of a flange portion of the upper portion of the socket 28 is depressed upward to be thin compared with another part of the flange portion. The cam portion 136 of the direction switching lever 130 and the protrusions 156 on the base portion 150 of the retainer 142 are entered into the depressed portion. The pair of protrusions 156 are positioned right and left of the cam portion 136.

Additionally, these projections 152 are disposed at regular intervals in a circumferential direction. A surface outside in a radial direction of each projection 152 serves as a part of a cylindrical surface. The projections 152 each have a length in the up-down direction similar to a length of each locking pin 140.

The springs 154 include mounting portions wound outer sides in the radial direction at the centers of the projections 152 by half turn and leaf spring portions partially in contact with the projections 152 while warped into a ")" shape or a "(" shape on both sides of the mounting portions. It should be noted that the spring 154 may be an elastic block, may be mounted by a method other than winding, or may be individually disposed on each side of the projection 152.

The ring 144 contacts the lower end portions of the respective projections 152 of the retainer 142 and is adjacent to the lower end portions of the respective locking pins 140.

The upper C-shaped ring 146 is interposed between the lower surface of the flange portion of the upper portion of the socket 28 and the top surface of the base portion 150 to press the retainer 142 downward.

The lower C-shaped ring 148 is disposed on the lower side of the ring 144 and is mounted to the lower portion of the frame-shaped portion 52 of the gear housing 42 together with the ring 144.

The locking pins 140 in a state of having the up-down direction in its axis direction are disposed one by one between the adjacent projections 152 and between the adjacent leaf spring portions of the springs 154. Each locking pin 140 has an upper end portion adjacent to the base portion 150 of the retainer 142 and a lower end portion adjacent to the top surface of the ring 144. Additionally, an inner surface of the hole of the holder 26 and an inner surface of the hole of the frame-shaped portion 52 of the gear housing 42 are positioned radially outward of the base portion 150 in the respective locking pins 140. These inner surfaces are cylindrical surfaces. Meanwhile, the outer surface at the center of the socket 28 is positioned radially inward of the base portion 150 in the respective locking pins 140. The outer surface at the center of the socket 28 has a shape equivalent to a side surface of a regular octagonal pillar. In more detail, the outer surface is a side surface of a chamfered regular octagonal pillar, that is, a side surface of a hexadecagonal pillar having a shape close to the regular octagonal pillar. Each side surface has a length in the up-down direction similar to a length of each locking pin 140. Additionally, each side surface has a width in a circumferential direction around twice to three times of a diameter of each locking pin 140.

The pair of protrusions 156 are positioned on the upper side of the pair of projections 152 between which the locking pin 140 on the frontmost is interposed, and the cam portion 136 of the direction switching lever 130 is positioned above the locking pin 140 on the frontmost.

Figure 13A:
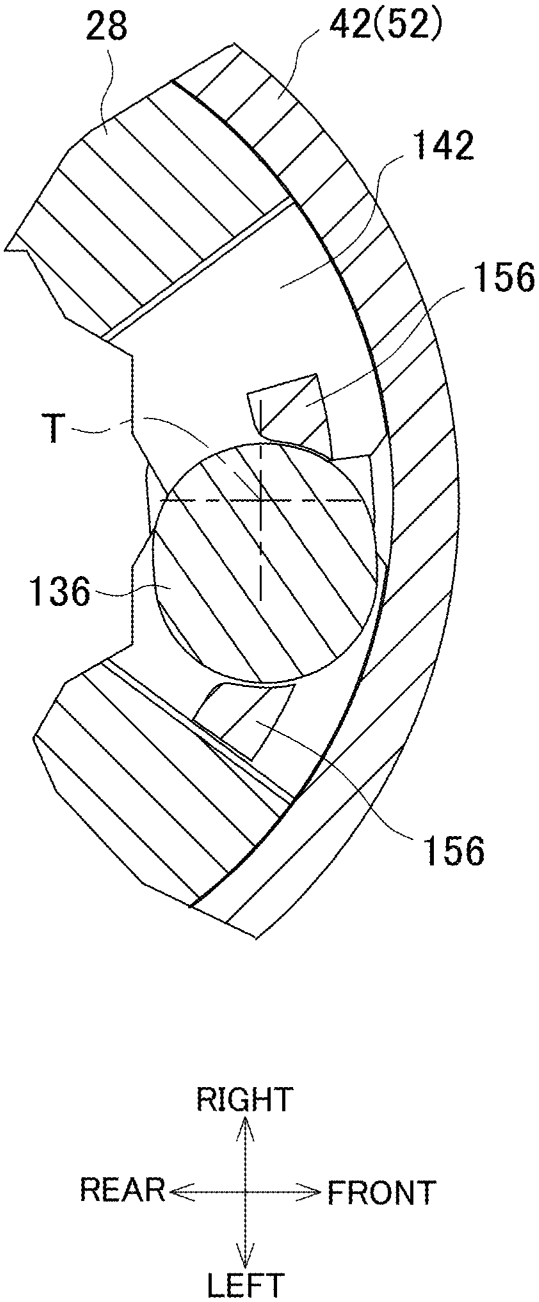
FIG. 13A is an enlarged view of a front portion of FIG. 12 and a drawing when the operating unit of the direction switching lever is on a right side.

In a case where the operating unit 132 of the direction switching lever 130 is engaged with the right depressed portion 138 (a case illustrated in each drawing), as illustrated in FIG. 13A, the cam portion 136 is at a rotation position (phase) where the most part of the cam portion 136 is positioned left viewed from a rotational center T matching with the center of the shaft portion 134 to dispose the retainer 142 at a phase illustrated in FIG. 10A via the protrusions 156. The respective locking pins 140 are disposed at positions outward of one surface corresponding to the side surface of the socket 28 having the regular octagonal pillar and approaching a clockwise direction (a direction of an arrow L1) in FIG. 10A viewed from a center line U in the up-down direction passing through a circumferential center of the one surface with the projections 152 of the retainer 142.

In this case, the spaces in which the respective locking pins 140 are disposed include large interval portions and small interval portions. The large interval portion is interposed between a virtual first surface, which is formed by radially extending the center line U on the outer surface of the socket 28 to the inner surface of the hole of the holder 26 and the inner surface of the hole of the frame-shaped portion 52, and a virtual second surface opposed to the first surface separated around a radius of the locking pin 140. The small interval portion is adjacent to the second surface of the large interval portion in the direction of the arrow L1. A maximum distance Ka in a radial direction in the large interval portion is a dimension of a side in the radial direction of the first surface and is larger than a smallest distance Kb in the radial direction in the small interval portion. The distance Ka is equal to or more than the diameter of the locking pin 140, and the distance Kb is less than the diameter of the locking pin 140.

In respective spaces in this case, the small interval portions are all disposed in the direction of the arrow L1 viewed from the large interval portions and are similar to one another in the rotation direction (circumferential direction) of the socket 28.

In this state, the rotation of the holder 26 in the direction of the arrow L1 (lock direction) causes the respective locking pins 140 to approach the small interval portion sides from the state illustrated in the drawing in association with the rotation of the holder 26 by, for example, friction force and inertia force from the holder 26, and the locking pins 140 are in line contact with the respective holder 26 and socket 28 and are meshed between the portions, and the socket 28 locks the holder 26 with the meshed locking pins 140 to rotate integrally with the holder 26. The meshing of the locking pins 140 is assisted by the biasing action caused by pressing by the leaf spring portions of the springs 154 disposed on the side in the opposite direction to the arrow L1. It should be noted that the leaf spring portions of the springs 154 disposed on the side of the arrow L1 direction are disposed so as to hardly act to the meshed locking pins 140 and therefore do not press the meshed locking pins 140.

Meanwhile, the rotation of the holder 26 in the direction opposite to the arrow L1 (free direction) causes the respective locking pins 140 to approach the large interval portion sides in association with the rotation of the holder 26 as illustrated in the drawing to be released from the meshed state, the lock of the holder 26 by the socket 28 is released, the relative rotation of the socket 28 to the holder 26 is allowed, and the socket 28 idles to the holder 26.

Figure 13B:
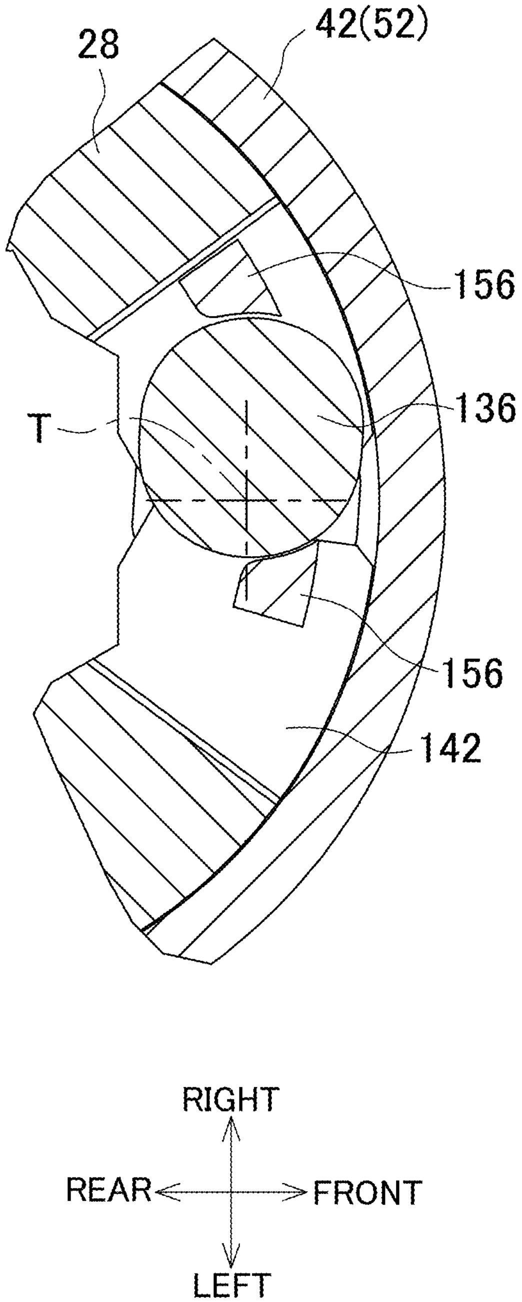
FIG. 13B is an enlarged view of a front right portion of FIG. 12 and a drawing when an operating unit of a direction switching lever is on a left side.

Alternatively, in a case where the operating unit 132 of the direction switching lever 130 is moved from a position engaged with the right depressed portion 138 to a position engaged with the left depressed portion 138, as illustrated in FIG. 13B, the cam portion 136 is rotated to move to a phase where the most part of the cam portion 136 is positioned right viewed from the rotational center T. Then, the retainer 142 is rotated to move such that a distance becomes around one time to 1.5 times of the diameter of each locking pin 140 (around a half of the width in the circumferential direction of each side surface of the socket 28) to cause the retainer 142 to reach the phase illustrated in FIG. 10B. The respective locking pins 140 are disposed at positions approaching an anticlockwise direction (a direction of an arrow L2) in FIG. 10B viewed from the center line U on one side surface of the socket 28 with the retainer 142.

In this case, the spaces in which the respective locking pins 140 are disposed include large interval portions and small interval portions. The large interval portion is interposed between a virtual third surface, which is formed by radially extending the center line U on the outer surface of the socket 28 to the inner surface of the hole of the holder 26 and the inner surface of the hole of the frame-shaped portion 52, and a virtual fourth surface opposed to the third surface separated around a radius of the locking pin 140. The small interval portion is adjacent to the fourth surface of the large interval portion in the direction of the arrow L2. A maximum distance Kc in a radial direction in the large interval portion is a dimension of a side in the radial direction of the third surface and is larger than a smallest distance Kd in the radial direction in the small interval portion. The distance Kc is equal to or more than the diameter of the locking pin 140, and the distance Kd is less than the diameter of the locking pin 140.

The distance Kc in this case is approximately identical to the above-described distance Ka, and the large interval portion in this case and the above-described large interval portion can be grasped as one common large interval portion.

Additionally, since the center of the socket 28 has the regular octagonal pillar shape and the inner surface of the hole of the holder 26 is the cylindrical surface, the small interval portion in this case is symmetrical to the above-described small interval portion with respect to the center line U as a symmetrical axis, and the distance Kd and the above-described distance Kb are approximately equal.

In respective spaces in this case, the small interval portions are all disposed in the direction of the arrow L2 viewed from the large interval portions and are similar to one another in the rotation direction (circumferential direction) of the socket 28.

In this state, the rotation of the holder 26 in the direction of the arrow L2 (lock direction) causes the respective locking pins 140 to approach the small interval portion sides from the state illustrated in the drawing, and the locking pins 140 are in line contact with the respective holder 26 and socket 28 and are meshed between the portions, and the socket 28 locks the holder 26 to rotate integrally with the holder 26. The meshing of the locking pins 140 is assisted by the bias by the leaf spring portions of the springs 154 disposed on the side in the opposite direction to the arrow L2.

Meanwhile, the rotation of the holder 26 in the direction opposite to the arrow L2 (free direction) causes the respective locking pins 140 to approach the large interval portion sides as illustrated in the drawing to be released from the meshed state, the lock of the holder 26 by the socket 28 is released, and the socket 28 idles to the holder 26.

The arrows L1 and L2, which correspond to the directions that the socket 28 locks the holder 26, face the opposite directions to one another. The user changes the position of the operating unit 132 of the direction switching lever 130 to ensure switching the lock direction. The direction of the arrow L2 is in the clockwise direction viewed from above and may be referred to as a forward direction, and the direction of the arrow L1 is in the anticlockwise direction viewed from the above and may be referred to as a reverse direction.

It should be noted that the numbers of locking pins and spaces are not limited to eight but may be one or more to seven or less or may be nine or more. A part of the plurality of spaces and locking pins may have different shapes and sizes from the other spaces and locking pins, that is, the number of types of the spaces and the locking pins may be plural. In the spaces, the small interval portion may be disposed only on one side of the large interval portion. As long as the space including the large interval portion and the small interval portion is formed, the outer surface of the socket 28 may have a side surface shape of another regular polygonal prism or may have a side surface shape of a polygonal prism, such as an octagonal pillar not a regular octagonal pillar. Additionally, the outer surface of the socket 28 may be configured to have a cylindrical surface shape (columnar surface shape), the inner surface of the hole of the holder 26 may be configured to have a side surface shape of a regular polygonal prism or a side surface shape of a polygonal prism not a regular polygonal prism, or both of the outer surface of the socket 28 and the inner surface of the hole of the holder 26 may be configured to have a side surface shape of a polygonal prism. Alternatively, for example, a curved surface, such as an elliptic cylindrical surface, and a combination of a curved surface and a side surface of a polygonal prism may be used.

The operation example of the electric ratchet wrench 1 will be described.

The user mounts the battery 10 preliminarily charged with a charger to the battery mounting portion 12 by sliding forward.

Then, when the user grips the handle portion 14, slides the slider 78 on the lock arm 76 rearward, and presses the button portion 72 on the lever 68 upward, the plunger 66 is pressed upward and the switch 62 switches to on. The battery 10 feeds power to the light 122 and the motor 16 via the controller 61, the light 122 lights up to illuminate below the socket 28, and the motor shaft 92 of the motor 16 is driven by the control by the controller 61. It should be noted that the switching of the switch 62 and the control by the controller 61 may be adjusted such that switching timings of the light 122 and the motor 16 become different, such as the light 122 turning on at the beginning of a rising of the plunger 66 (beginning of pressing the button portion 72) and the motor 16 tuning on at further rising (pressing the button portion 72).

The rotation of the motor shaft 92 rotates the fan 94 to exhaust air from the exhaust outlets 95 and 96 and wind from the air inlets 98 to the exhaust outlets 95 and 96 is formed. The wind cools an internal mechanism of the electric ratchet wrench 1, such as the motor 16.

Further, a rotation force of the motor shaft 92 is decelerated by the planetary gear mechanism 20 and transmitted to the spindle 22. The rotation force of the spindle 22 is converted into the right and left reciprocating rotation motion forces of the holder 26, and the converted forces are appropriately transmitted to the socket 28 via the one-way clutch mechanism 30.

The action of the one-way clutch mechanism 30 applies the reciprocating rotation motion force in the lock direction to the socket 28 and the socket adapter 34 and the exchange socket mounted to the socket 28 by the meshing of the respective locking pins 140 in the small interval portions. The reciprocating rotation motion force in the free direction is not applied by releasing the meshing by the movement of the respective locking pins 140 to the large interval portions. Accordingly, the socket 28 and the exchange socket give a torque to the fitted nut or the like only in the lock direction and do not give a torque in the opposite direction. Therefore, the fastening of the nut or the like is progressed intermittently in the lock direction at each reciprocation motion or the removal is similarly progressed.

In a case where an electric power of the battery 10 becomes insufficient, the user removes the battery 10 from the battery mounting portion 12 by sliding rearward, sets the battery 10 to the charger for charging, and mounts the charged battery 10 or another battery 10 to the battery mounting portion 12.

The electric ratchet wrench 1 according to the first embodiment described above includes the electric motor 16, the holder 26, and the spindle 22. The holder 26 rotatably holds the socket 28 via the one-way clutch mechanism 30. The spindle 22 is configured to convert the driving force from the motor 16 into the reciprocating rotation motion of the holder 26. The space is provided between the socket 28 and the holder 26. The space includes the large interval portion and the small interval portion. The small interval portion is adjacent to the large interval portion in the rotation direction (lock direction) of the socket 28. The small interval portion has the distance Kb or Kd smaller than that (distance Ka or Kc) of the large interval portion. The one-way clutch mechanism 30 includes the columnar locking pin 140 disposed in the space. The locking pin 140 has the diameter having the size equal to or less than the distance Ka or Kc of the large interval portion and exceeding the distance Kb or Kd of the small interval portion.

Accordingly, the rotation of the holder 26 in the direction from the large interval portions to the small interval portions (lock direction) causes the locking pins 140 to enter the small interval portions having the distances Kb and Kd less than the diameter of the locking pin 140 and to be meshed between the holder 26 and the socket 28, and the socket 28 integrally rotates with the holder 26. Meanwhile, the rotation of the holder 26 in the direction from the small interval portions to the large interval portions (free direction) causes the locking pins 140 to enter the large interval portions having the distances Ka and Kc equal to or more than the diameter of the locking pin 140, the meshing of the locking pins 140 between the holder 26 and the socket 28 is released, and the socket 28 idles to the holder 26.

The one-way clutch mechanism 30 includes the large interval portions and the small interval portions, and can be installed only by ensuring the spaces where the locking pins 140 are entered, which results in being compact. Further, since the one-way clutch mechanism 30 performs locking by meshing the locking pins 140, sufficient locking strength can be obtained without increasing the sizes of the locking pins 140 so much. Therefore, the electric ratchet wrench 1 having both compactability and a lock performance is provided.

Additionally, the small interval portions are disposed on both sides in the circumferential direction of the large interval portions. The retainer 142 that can change the spaces for one small interval portion and large interval portion (see FIG. 10A) to spaces for another small interval portion and large interval portion (see FIG. 10B) is disposed between the socket 28 and the holder 26. Accordingly, the retainer 142 can switch the direction that the locking pins 140 are meshed from the large interval portions to the small interval portions. Thus, the lock direction can be easily and reliably switched.

Further, the retainer 142 includes the pair of protrusions 156, and the direction switching lever 130 including the cam portion 136 in contact with the protrusions 156 is disposed on the socket 28. Accordingly, the lock direction can be further easily and reliably switched.

Further, the springs 154 that bias the locking pins 140 in the direction where the small interval portions are disposed viewed from the large interval portions are disposed in the retainer 142. Accordingly, the movement of the locking pins 140 to the small interval portions is assisted, and the socket 28 is further smoothly locked with the locking pins 140, thus further improving the lock performance.

In addition, the plurality of spaces are disposed in the state where the arrangements of the small interval portions relative to the large interval portions in the rotation direction are similar to one another, and the locking pins 140 are disposed between the respective spaces. Accordingly, the plurality of locking pins 140 mesh in the lock direction, and thus the electric ratchet wrench 1 with the further improved locking strength is provided.

Additionally, the socket 28 has the outer surface formed into the side surface shape of the regular octagonal pillar, and the holder 26 has the inner surface formed into the cylindrical surface shape. Accordingly, the spaces including the large interval portions and the small interval portions are simply formed, and the plurality of spaces including the small interval portions on both sides of the large interval portions are simply formed.

It should be noted that the above-described electric ratchet wrench 1 as one example of the straight type electric power tool includes the motor 16, the power transmission unit 24, the battery 10, and the battery mounting portion 12. The power transmission unit 24 transmits the driving force from the motor 16 to the output unit 32 on the front side. The battery 10 drives the motor 16. The battery 10 is mounted to the battery mounting portion 12. The motor 16, the power transmission unit 24, and the output unit 32 are linearly arranged in the front-rear direction. The output axis O of the output unit 32 is directed in the up-down direction intersecting with the front-rear direction and extends downward. The battery mounting portion 12 is disposed at the rear of the power transmission unit 24 and the motor 16. The battery 10 is slidingly mounted to the upper side (the side opposite to the side from which the output axis O extends) of the battery mounting portion 12. Thus, the battery 10 is easily replaced and the electric ratchet wrench 1 excellent in operability regarding the battery 10 is provided.

Additionally, the battery 10 is mounted so as to be oriented in the front-rear direction. Accordingly, the mounted battery 10 is oriented in the same direction as the direction in which the motor 16, the power transmission unit 24, and the output unit 32 are arranged. The battery 10 is mounted with a small protrusion from the motor 16, the power transmission unit 24, and the output unit 32, thereby further facilitating the operation of the electric ratchet wrench 1.

Further, the motor 16, the power transmission unit 24, and the output unit 32 are arranged around the machine axis M, and the battery mounting portion 12 is put to one side, which is the lower side, with respect to the machine axis M. Thus, compared with a case where the battery mounting portion 12 is not put to one side, the battery 10 is mounted more closer to the machine axis M. Accordingly, the battery 10 is mounted with a further small protrusion and its center of gravity is further close to the machine axis M, thus improving the operability of the electric ratchet wrench 1.

It should be noted that the first embodiment of the invention is not limited to the above-described embodiments and modification examples but, for example, further includes the following modification examples appropriately.

The battery mounting portion may be formed to face downward such that the terminal projects downward from the lower surface and further may be put to one side, which is the upper side, with respect to the machine axis or its extended line.

A plurality of batteries may be mounted. In this case, when all batteries are disposed to be oriented in the front-rear direction, the batteries are each mounted with a small protrusion. For example, the respective batteries oriented in the front-rear direction may be mounted to the top and bottom of the rear portion of the main body housing formed so as to expand from front to back and from side to side including the machine axis or its extended line.

The batteries may be mounted to the right and left of the rear portion of the main body housing. Additionally, the battery may be mounted in an oblique direction having an angle with respect to a direction (front-rear direction) in which the motor, the planetary gear mechanism, and the spindle are arranged. Further, the battery mounting portion may be rotatable to another part, such as the main body housing, such that a posture of the mounted battery (for example, from a horizontal posture to a vertical posture) relative to the front-rear direction becomes variable.

Regarding the planetary gear mechanism, instead of the insertion of the pin to the carrier, for example, a shaft-shaped protrusion may be formed integrally with the carrier.

The planetary gear mechanism may be changed to another deceleration mechanism, may be configured as a mechanism transmitting power without deceleration, or may be omitted.

One or two or more of intermediate shafts may be interposed between the motor shaft and the holder.

As the battery, any lithium-ion battery, such as 14.4 V, 18 V (maximum 20 V), 18 V, 25.2 V, 28 V, and 36 V may be used, a lithium-ion battery having a voltage less than 10.8 V or exceeding 36 V may be used, or a battery of another type may be used. The battery may be rechargeable in a state being mounted to the battery mounting portion.

Instead of the battery mounting portion and the battery, a power supply cord coupled to a commercial power supply may be disposed and an AC motor is used as the motor to configure an AC electric ratchet wrench. Alternatively, the motor may be configured as a motor driven by air to configure an air ratchet wrench as one example of an air tool. With the air ratchet wrench, the spindle may be directly rotated by air. The numbers of various members and parts, and arrangements, materials, sizes, configurations, and the like of various members and parts may be appropriately changed, such as increase and decrease in the number of sections of the housing, the number of installed planetary gears, the number of stages of the planetary gear mechanism, the number of exhaust outlets, and the number of bearings.

Further, the invention is applicable to, for example, another straight type electric power tool, such as a multi tool and a multi cutter, a straight type electric power tool coupled to a commercial power supply, or a straight type gardening tool, such as a trimmer for gardening.

Second Embodiment

An electric ratchet wrench according to the second embodiment of the invention is configured similarly to the first embodiment excluding the locking pins and the retainer of the one-way clutch mechanism and the socket. Same reference numerals are given to the members and the parts configured similarly to those of the first embodiment and descriptions thereof are appropriately omitted.

Figure 14A:
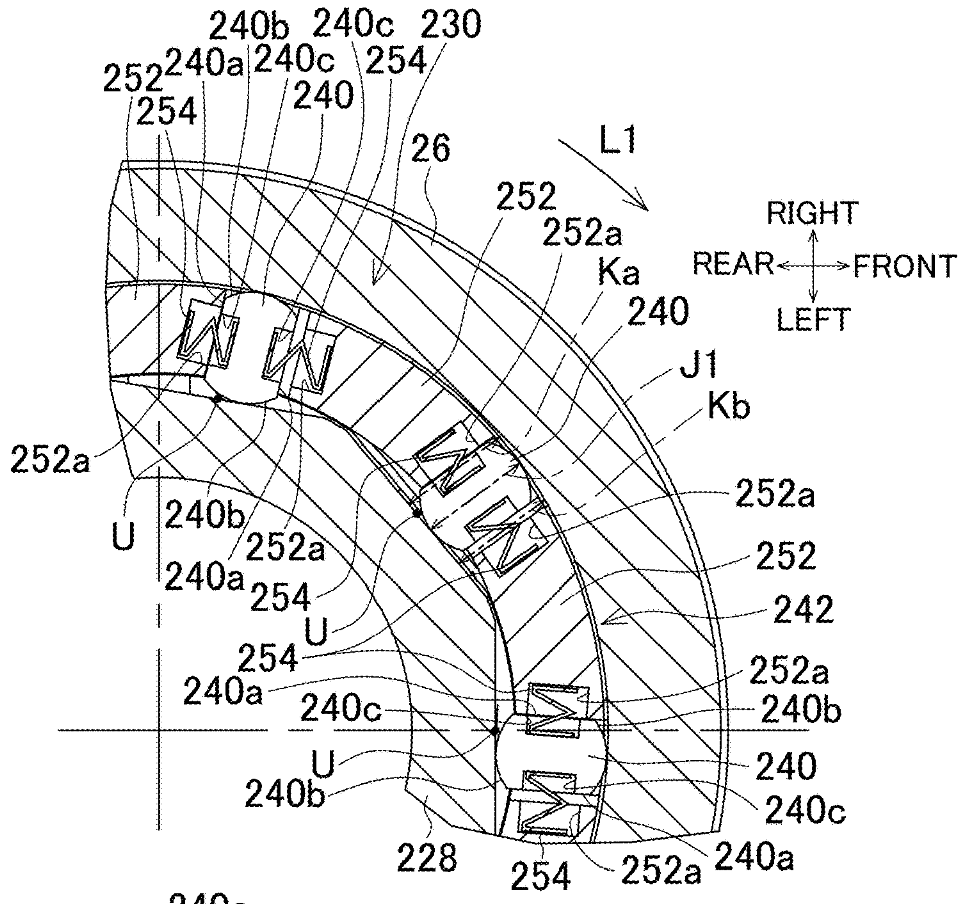
FIG. 14A is an enlarged view similar to FIG. 10A and a drawing when an operating unit of a direction switching lever is on a right side according to a second embodiment of the invention.
Figure 14B:
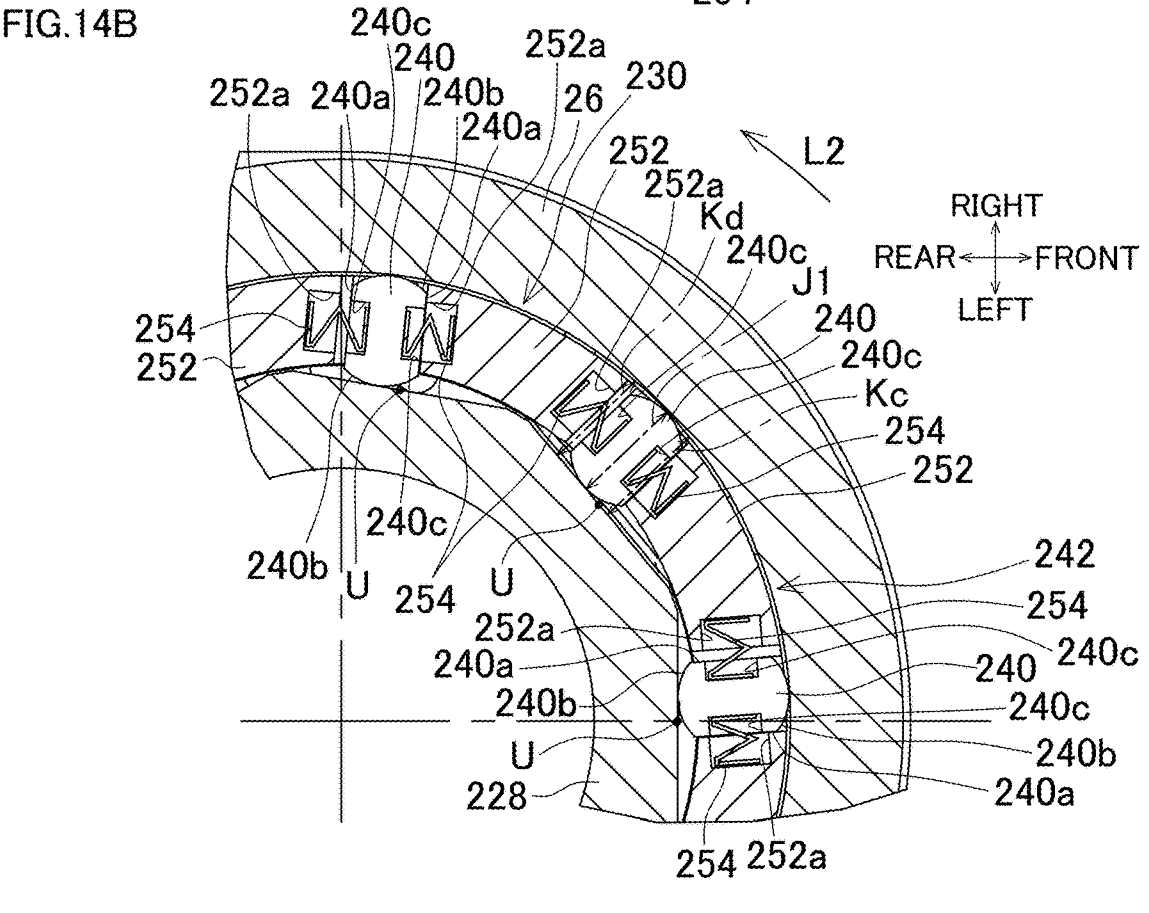
FIG. 14B is an enlarged view similar to FIG. 10B and a drawing when an operating unit of a direction switching lever is on a left side according to a second embodiment of the invention.

FIG. 14 is a drawing according to the second embodiment similar to FIG. 10.

An outer surface at the center of a socket 228 of the second embodiment has a shape equivalent to a side surface of a regular nonagonal pillar.

Locking pins 240 of a one-way clutch mechanism 230 of the second embodiment are disposed by nine. Projections 252 of a retainer 242 of the second embodiment are disposed by nine, and nine spaces are disposed between the projections 252 where the locking pins 240 are disposed similarly to the first embodiment.

The respective locking pins 240 as locking members are pillar-shaped members having the axis direction in the up-down direction. A cross-sectional surface of each locking pin 240 perpendicular to the axis direction has an elliptical shape. In more detail, the cross-sectional surface has a shape enclosed by a pair of parallel straight lines facing one another and a pair of arcs convexed outward coupled to any one of end portions of the straight lines. Accordingly, the locking pins 240 each include a pair of planar portions 240*a* parallel in the axis direction and a pair of cylindrical surface-shaped bulge portions 240*b*.

In each locking pin 240, a virtual plane parallel to both planar portions 240*a* at equal distances includes a center axis at the center of the socket 228. Each locking pin 240 faces a radial direction as a direction perpendicular to the rotation direction of the socket 228 (a direction perpendicular to the retainer 242 and the annular-shaped part of the holder 26). Between the pair of bulge portions 240*b* (distance J1) has a size equal to or less than the distances Ka and Kc of the large interval portions and exceeding the distances Kb and Kd of the small interval portions in the spaces in which the respective locking pins 240 are disposed.

Each locking pin 240 has a locking pin side depressed portion 240*c*, which depresses inward, at the center in the up-down direction in each planar portion 240*a*.

Additionally, projection part side depressed portions 252*a*, which depress inward, are disposed on both sides of the projection 252 of the retainer 242 in a circumferential direction and parts opposed to the locking pin side depressed portions 240*c*.

Springs 254 instead of the springs 154 of the first embodiment are bridged between the locking pin side depressed portions 240*c* and the projection part side depressed portions 252*a* facing one another.

The electric ratchet wrench of the second embodiment operates similarly to the electric ratchet wrench 1 of the first embodiment.

Especially, with an action of the one-way clutch mechanism 230, the reciprocating rotation motion force in the lock direction is applied to the socket 228 and the socket adapter 34 and the exchange socket mounted to the socket 228 by the pair of bulge portions 240*b* (distance J1) of the respective locking pins 240 being meshed to the small interval portions in line contact. The reciprocating rotation motion force in the free direction is not applied by releasing the meshing by the movement of the respective locking pins 240 to the large interval portions.

The meshing of the respective locking pins 240 are assisted by the biasing action by the springs 254 disposed on both sides of the projection 252 in the circumferential direction.

The electric ratchet wrench of the second embodiment includes the electric motor 16, the holder 26, and the spindle 22. The holder 26 rotatably holds the socket 228 via the one-way clutch mechanism 230. The spindle 22 is configured to convert the driving force from the motor 16 into the reciprocating rotation motion of the holder 26. The space is provided between the socket 228 and the holder 26. The space includes the large interval portion and the small interval portion. The small interval portion is adjacent to the large interval portion in the rotation direction (lock direction) of the socket 228. The small interval portion has the distance Kb or Kd smaller than that (distance Ka or Kc) of the large interval portion. The one-way clutch mechanism 230 includes the locking pin 240 disposed in the space. The locking pin 240 has the size equal to or less than the distance Ka or Kc of the large interval portion and exceeding the distance Kb or Kd of the small interval portion (distance J1).

Accordingly, the rotation of the holder 26 in the direction from the large interval portions to the small interval portions (lock direction) causes the locking pins 240 to enter the small interval portions having the distances Kb and Kd less than the size between the bulge portions 240*b* (distance J1) and to be meshed between the holder 26 and the socket 228, and the socket 228 integrally rotates with the holder 26. Meanwhile, the rotation of the holder 26 in the direction from the small interval portions to the large interval portions (free direction) causes the locking pins 240 to enter the large interval portions having the distances Ka and Kc equal to or more than the size between the bulge portions 240*b* (distance J1), the meshing of the locking pins 240 between the holder 26 and the socket 228 is released, and the socket 228 idles to the holder 26.

The one-way clutch mechanism 230 includes the large interval portions and the small interval portions, and can be installed only by ensuring the spaces where the locking pins 240 are entered, which results in being compact. Further, since the one-way clutch mechanism 230 performs locking by meshing the locking pins 240, sufficient locking strength can be obtained without increasing the sizes of the locking pins 240 so much. Therefore, the electric ratchet wrench having both compactability and a lock performance is provided.

Additionally, the locking pin 240 includes the pair of planar portions 240*a*, which are arranged in the direction that the small interval portions are disposed viewed from the large interval portions (circumferential direction), and the pair of bulge portions 240*b*, which couple between the end portions of the planar portions 240*a*. The size between the pair of bulge portions 240*b* (distance J1) is equal to or less than the distances Ka and Kc of the large interval portions and exceeding the distances Kb and Kd of the small interval portions. Accordingly, while the locking with the sufficient strength is obtained with the bulge portions 240*b*, the planar portions 240*a* make the locking pins 240 and eventually the holder 26 and the socket 228 compact. Additionally, disposing the locking pin side depressed portions 240*c* in the planar portions 240*a* prevents each locking pin 240 from rolling in the space and the springs 254 reliably enter the locking pin side depressed portions 240*c*. Even if the spring 254, which assists the meshing of each locking pin 240, has a shape other than the leaf spring or a comparatively large size, the spring 254 is reliably held.

Further, the pair of planar portions 240*a* are parallel to one another. Thus, the locking pin 240 or the like is downsized, and the holding portion where the spring 254 is reliably held is simply installed.

The electric ratchet wrench of the second embodiment appropriately has the modification examples similar to those of the first embodiment.

Additionally, at least one of the bulge portions 240*b* needs not to have the cylindrical surface.

The number of locking pins 240 may be a number other than nine. The socket 228 may have an octagonal pillar shape or less or may have a decagonal pillar shape or more, or may have another shape.

The locking pins 140 and 240 of the first and the second embodiments may be mixed.

Third Embodiment

An electric ratchet wrench according to the third embodiment of the invention is configured similarly to the second embodiment excluding the locking pins and the retainer of the one-way clutch mechanism. Same reference numerals are given to the members and the parts configured similarly to those of the second embodiment and descriptions thereof are appropriately omitted.

Figure 15A:
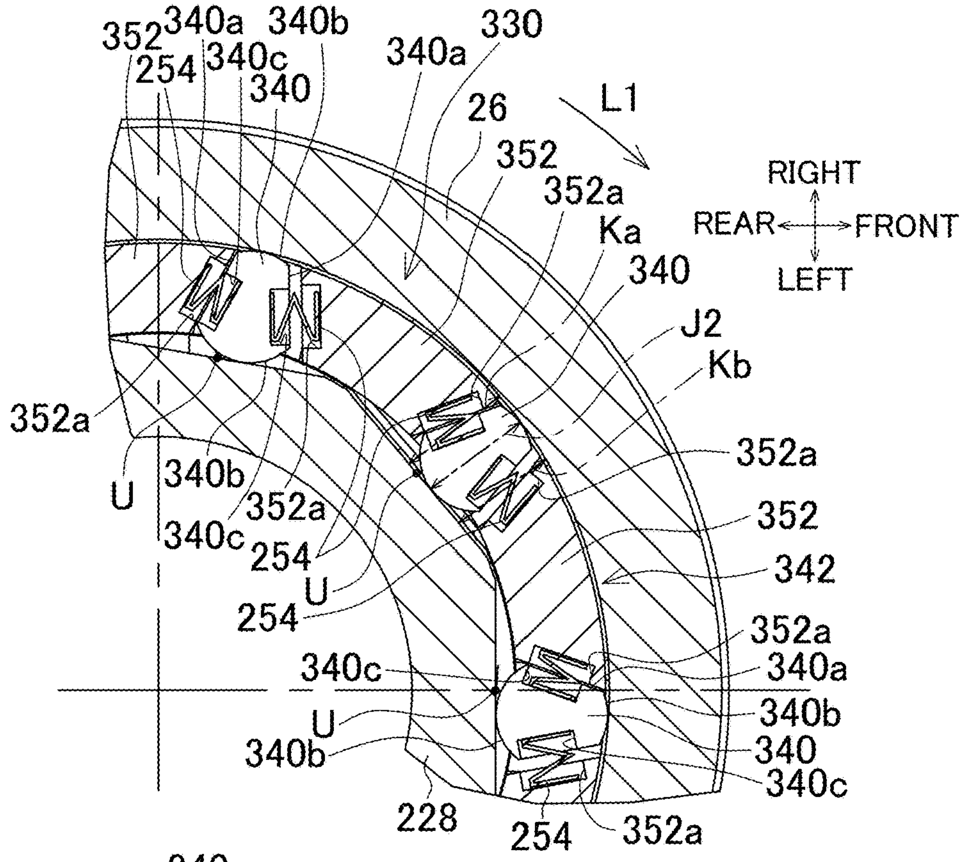
FIG. 15A is an enlarged view similar to FIG. 10A and a drawing when an operating unit of a direction switching lever is on a right side according to a third embodiment of the invention.
Figure 15B:
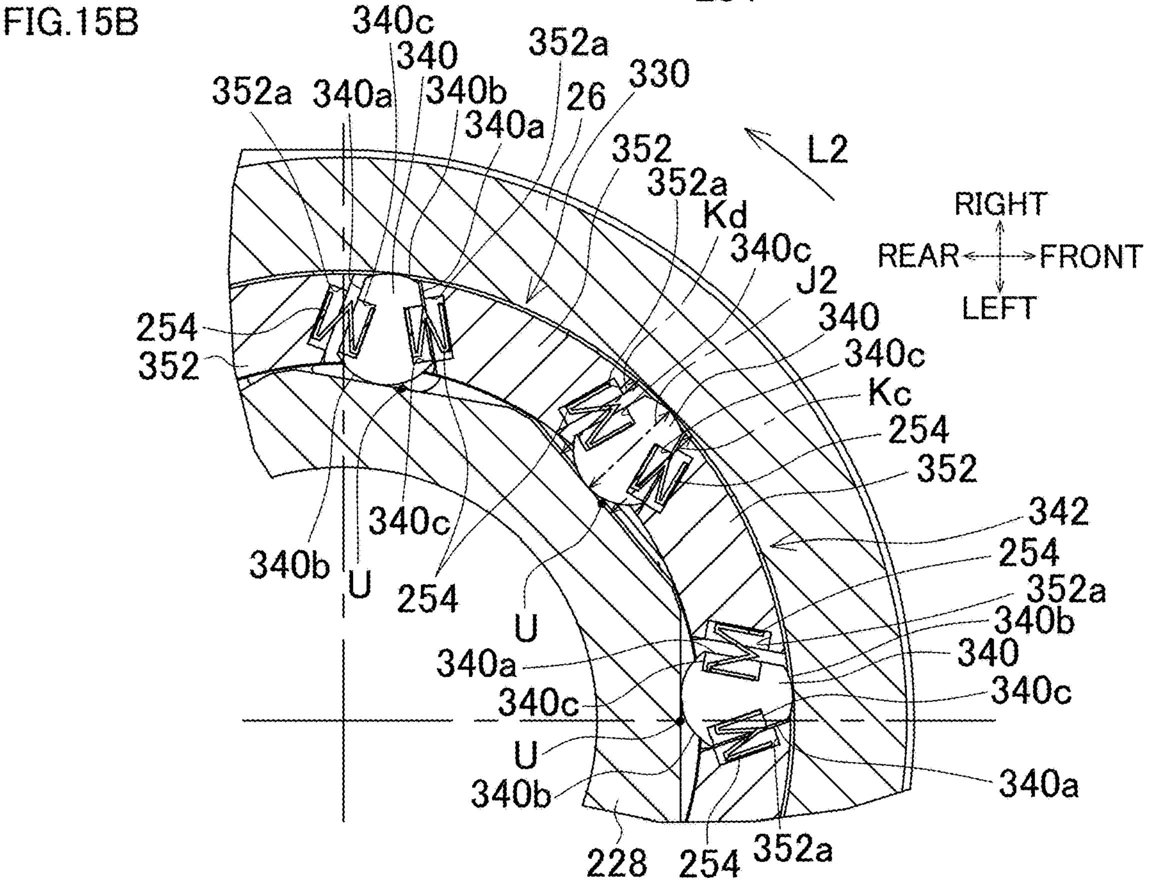
FIG. 15B is an enlarged view similar to FIG. 10B and a drawing when an operating unit of a direction switching lever is on a left side according to a third embodiment of the invention.

FIG. 15 is a drawing according to the third embodiment similar to FIG. 10.

In a projection 352 of a retainer 342 in a one-way clutch mechanism 330 of the third embodiment, an arc radially outside in its cross-sectional surface has a shape longer than an inner arc and surfaces of both end portions in the circumferential direction have a posture of expanding from a radial direction toward radially inside. In surfaces of both end portions in the circumferential direction of the projection 352, projection portion side depressed portions 352*a* perpendicular to the projection 352 are disposed.

The pair of planar portions 340*a* in nine locking pins 340 have a posture of expanding toward the socket 228. The planar portion 340*a* faces the surface of the end portion in the circumferential direction of the projection 352 parallel to one another. The planar portions 340*a* each include a locking pin side depressed portion 340*c* perpendicular to the planar portion 340*a*. The locking pin side depressed portion 340*c* faces the projection portion side depressed portion 352*a*. The size (distance J2) between bulge portions 340*b*, which couple between the end portions of the respective planar portions 340*a*, is equal to or less than the distances Ka and Kc of the large interval portions and exceeding the distances Kb and Kd of the small interval portions in the spaces in which the locking pins 340 are disposed.

The spring 254 similar to those of the second embodiment is bridged between the locking pin side depressed portion 340*c* and the projection portion side depressed portion 352*a*, which faces one another, so as to be oriented in the same directions of the locking pin side depressed portion 340*c* and the projection portion side depressed portion 352*a*.

The electric ratchet wrench of the third embodiment operates similarly to the electric ratchet wrench of the second embodiment.

Especially, with the action of the one-way clutch mechanism 330, the reciprocating rotation motion force in the lock direction is applied to the socket 228 and the socket adapter 34 and the exchange socket mounted to the socket 228 by the pair of bulge portions 340*b* (distance J2) of the respective locking pins 340 being meshed to the small interval portions in line contact. The reciprocating rotation motion force in the free direction is not applied by releasing the meshing by the movement of the respective locking pins 340 to the large interval portions.

The meshing of the respective locking pins 340 are assisted by the biasing action by the springs 254 disposed on both sides of the projection 352 in the circumferential direction.

The one-way clutch mechanism 330 of the electric ratchet wrench according to the third embodiment includes the locking pin 340 disposed in the space. The locking pin 340 has the size equal to or less than the distance Ka or Kc of the large interval portion and exceeding the distance Kb or Kd of the small interval portion (distance J2).

Accordingly, the rotation of the holder 26 in the direction from the large interval portions to the small interval portions (lock direction) causes the locking pins 340 to enter the small interval portions having the distances Kb and Kd less than the size between the bulge portions 340*b* (distance J2) and to be meshed between the holder 26 and the socket 228, and the socket 228 integrally rotates with the holder 26. Meanwhile, the rotation of the holder 26 in the direction from the small interval portions to the large interval portions (free direction) causes the locking pins 340 to enter the large interval portions having the distances Ka and Kc equal to or more than the size between the bulge portions 340*b* (distance J2), the meshing of the locking pins 340 between the holder 26 and the socket 228 is released, and the socket 228 idles to the holder 26.

The one-way clutch mechanism 330 includes the large interval portions and the small interval portions, and can be installed only by ensuring the spaces where the locking pins 340 are entered, which results in being compact. Further, since the one-way clutch mechanism 330 performs locking by meshing the locking pins 340, sufficient locking strength can be obtained without increasing the sizes of the locking pins 340 so much. Therefore, the electric ratchet wrench having both compactability and a lock performance is provided.

Additionally, the locking pin 340 includes the pair of planar portions 340*a*, which are arranged in the direction that the small interval portions are disposed viewed from the large interval portions (circumferential direction), and the pair of bulge portions 340*b*, which couple between the end portions of the planar portions 340*a*. The size between the pair of bulge portions 340*b* (distance J2) is equal to or less than the distances Ka and Kc of the large interval portions and exceeding the distances Kb and Kd of the small interval portions. Accordingly, while the locking with the sufficient strength is obtained with the bulge portions 340*b*, the planar portions 340*a* make the locking pins 340 and eventually the holder 26 and the socket 228 compact. Additionally, disposing the locking pin side depressed portions 340*c* in the planar portions 340*a* prevents each locking pin 340 from rolling in the space and the springs 254 reliably enter the locking pin side depressed portions 340*c*. Even if the spring 254, which assists the meshing of each locking pin 340, has a shape other than the leaf spring or a comparatively large size, the spring 254 is reliably held.

Further, the pair of planar portions 340*a* have a posture of expanding toward the socket 228. Accordingly, the locking pin 340 is each disposed in a state so as to increase in size in the circumferential direction as heading radially inward between the projections 352 of the retainer 342. Accordingly, when the holder 26, the socket 228, and the one-way clutch mechanism 330 are manufactured, the respective locking pins 340 are less likely to come off outside.

The electric ratchet wrench of the third embodiment appropriately has the modification examples similar to those of the second embodiment.

Additionally, at least one planar portion 340*a* may be configured as a curved surface and have a posture of expanding toward the socket 228.

At least any of two kinds of the locking pins 140, 240, and 340 according to the first to the third embodiment may be mixed.

Fourth Embodiment

An electric ratchet wrench according to the fourth embodiment of the invention is configured similarly to the first embodiment excluding the locking pins and the retainer of the one-way clutch mechanism. Same reference numerals are given to the members and the parts configured similarly to those of the first embodiment and descriptions thereof are appropriately omitted.

Figure 16A:
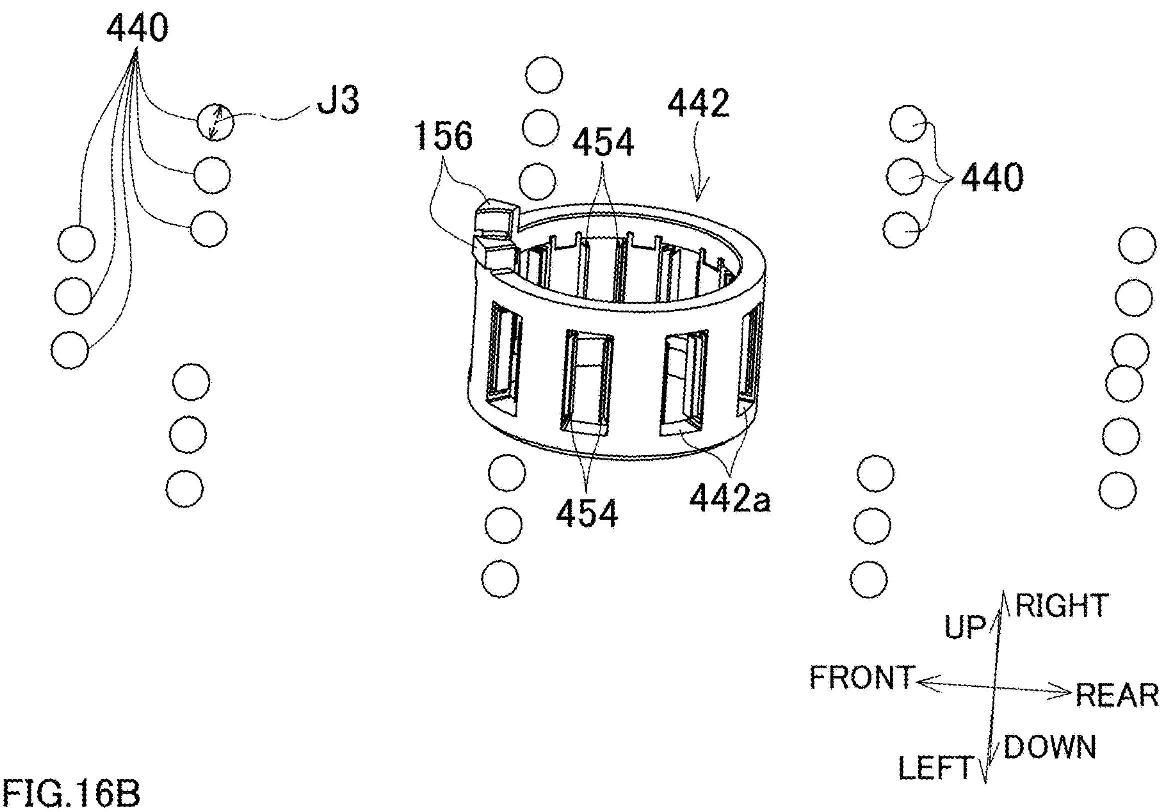
FIG. 16A is an exploded perspective view of a retainer and balls of an electric ratchet wrench according to a fourth embodiment of the invention when viewed from a left upper side.
Figure 16B:
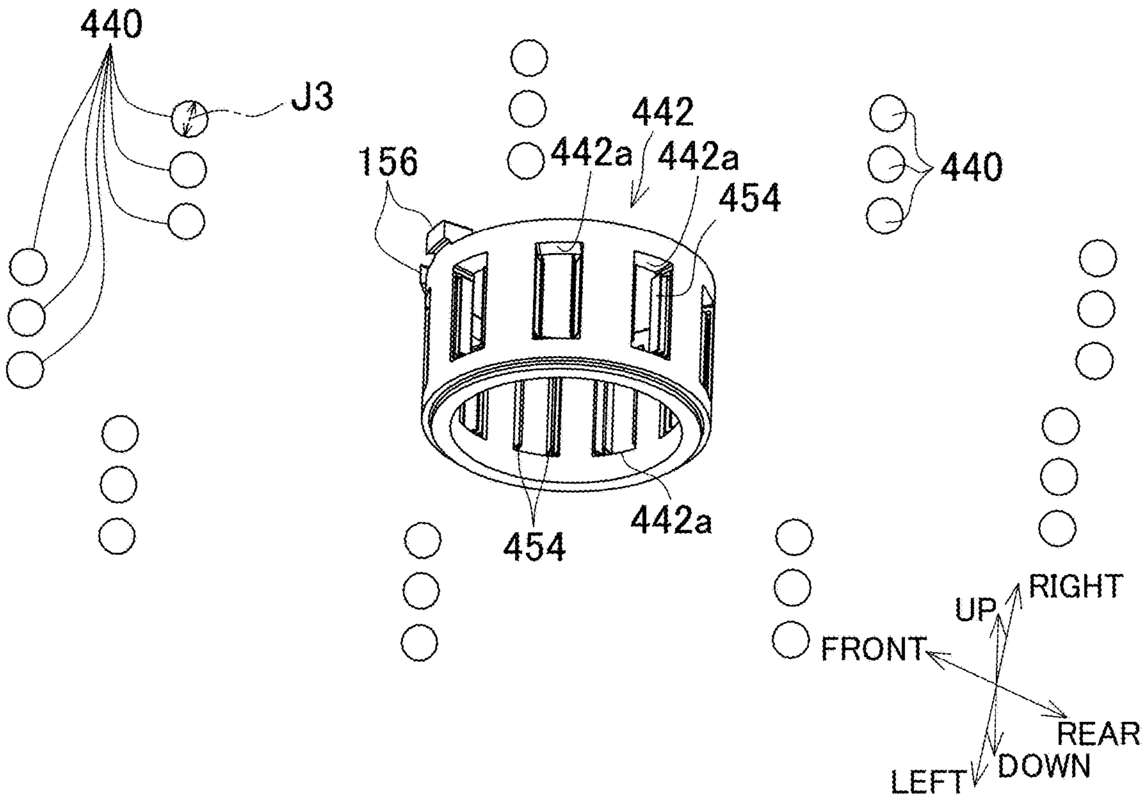
FIG. 16B is an exploded perspective view of a retainer and balls of an electric ratchet wrench according to a fourth embodiment of the invention when viewed from a left lower side.

FIGS. 16A and 16B are exploded perspective views of a retainer and balls of the electric ratchet wrench according to the fourth embodiment when viewed from a left upper side (FIG. 16A) and a left lower side (FIG. 16B).

In a retainer 442 in the one-way clutch mechanism of the fourth embodiment, the projections 152 of the first embodiment are disposed by nine and lower end portions of the respective projections 152 are coupled into a ring shape (the ring 144 is integrated with the retainer 142.) That is, the retainer 442 is a cylindrical member having nine windows 442*a* circumferentially arranged and each extending up and down. Thus, since the retainer 442 is configured by coupling the lower end portions of the respective projections 152 into the ring shape, the strength is further excellent.

Excluding that leaf spring portions are not warped and mounting portions of leaf springs are routed to an inside of the retainer 442, springs 454 configured similarly to the springs 154 of the first embodiment are disposed on both sides of the windows 442*a* in the circumferential direction.

Since the nine windows 442*a* are disposed, the nonagonal pillar-shaped socket 228 according to the second embodiment is used in the fourth embodiment.

Similar to the space between the projections 152 of the retainer 142 of the first embodiment, the respective windows 442*a* form spaces including the large interval portions (distances Ka and Kc) and the small interval portions (distances Kb and Kd) between the socket 228 and the holder 26.

In each window 442*a*, three balls 440 (locking members) made of iron are disposed to be arranged up to down.

Each ball 440 has a diameter with a size (distance J3) equal to or less than the distance Ka or Kc of the large interval portion and exceeding the distance Kb or Kd of the small interval portion.

The balls 440 are each configured to contact the spring 454.

The electric ratchet wrench of the fourth embodiment operates similarly to the electric ratchet wrench 1 of the first embodiment.

Especially, with an action of the one-way clutch mechanism of the fourth embodiment, the reciprocating rotation motion force in the lock direction is applied to the socket 228 and the socket adapter 34 and the exchange socket mounted to the socket 228 by meshing (point contact) of each ball 440 (of which diameter is distance J3) to the small interval portion. The reciprocating rotation motion force in the free direction is not applied by releasing the meshing by the movement of the respective balls 440 to the large interval portions.

The meshing of the respective balls 440 is assisted by a biasing action of the springs 454 disposed on both sides of the windows 442*a* in the circumferential direction.

The one-way clutch mechanism of the electric ratchet wrench of the fourth embodiment includes the balls 440 disposed in the windows 442*a* and having the size (distance J3) equal to or less than the distances Ka and Kc of the large interval portions and exceeding the distances Kb and Kd of the small interval portions.

Accordingly, the rotation of the holder 26 in the direction from the large interval portions to the small interval portions (lock direction) causes the balls 440 to enter the small interval portions having the distances Kb and Kd less than the diameter of the balls 440 (distance J3) and to be meshed between the holder 26 and the socket 228, and the socket 228 integrally rotates with the holder 26. Meanwhile, the rotation of the holder 26 in the direction from the small interval portions to the large interval portions (free direction) causes the balls 440 to enter the large interval portions having the distances Ka and Kc equal to or more than the size of the diameter of the ball 440 (distance J3), the meshing of the balls 440 between the holder 26 and the socket 228 is released, and the socket 228 idles to the holder 26.

The one-way clutch mechanism of the fourth embodiment includes the large interval portion and the small interval portion, and can be installed only by ensuring the spaces where the balls 440 are entered, which results in being compact. Further, since the one-way clutch mechanism of the fourth embodiment performs locking by meshing the balls 440, sufficient locking strength can be obtained without increasing the sizes of the balls 440 so much.

Therefore, the electric ratchet wrench having both compactability and a lock performance is provided.

Additionally, since the locking members are the balls 440, the locking member can be achieved at a low cost.

The electric ratchet wrench according to the fourth embodiment appropriately has modification examples similar to those of the first to third embodiments.

Additionally, the balls 440 may be disposed in each window 442*a* by two or less or may be disposed by four or more, or the different numbers of the balls 440 may be disposed in each of the windows 442*a*.

A locking member formed by coupling the plurality of balls 440 into a rod shape may be employed.

The number of windows 442*a* may be eight or less or may be 10 or more. Arrangement of the windows 442*a* may be changed, such as the plurality of windows 442*a* being arranged in the up-down direction.

At least any of two kinds of the locking pins 140, 240, and 340, and the balls 440 of the first to fourth embodiment may be mixed.

In the first to third embodiments, the retainer 442 according to the fourth embodiment may be used.

The invention claimed is:

1. An electric ratchet wrench comprising:
- an electric motor;
- a reciprocating motion conversion mechanism disposed in front of the motor and configured to be driven by the motor;
- a holder disposed in front of the reciprocating motion conversion mechanism and connected to the reciprocating motion conversion mechanism;
- a switch disposed at a rear of the motor and configured to switch between on and off;
- a lever disposed below the switch and configured to operate the switch;
- a battery mounting portion disposed at a rear of the switch and configured to mount a battery;
- a housing that houses the motor and the switch and has the battery mounting portion; and
- a slider disposed on an upper surface of the housing and configured to block upward movement of the lever.

2. The electric ratchet wrench according to claim 1 further comprising:
- a lock arm disposed below the slider, wherein
- a lower end portion of the lock arm abuts on the lever when the slider is at a first position, and
- the lower end portion of the lock arm is away from the lever when the slider is at a second position different from the first position.

3. The electric ratchet wrench according to claim 2, wherein the lock arm is pivotable.

4. The electric ratchet wrench according to claim 2, wherein
- the switch is disposed at a rear of the lock arm.

5. The electric ratchet wrench according to claim 1, wherein
- the slider is configured to move in a front-rear direction,
- the slider is configured to block upward movement of the lever when the slider is positioned forward, and
- the slider is configured to not block upward movement of the lever when the slider is positioned rearward.

6. The electric ratchet wrench according to claim 1, further comprising:
- a controller for controlling rotation of the motor, the controller being disposed at the rear of the switch and the lever.

7. An electric power tool comprising:
- an electric motor that includes a motor shaft extending in a front-rear direction;
- an output axis disposed in front of the motor and extending in the front-rear direction;
- a switch disposed at a rear of the motor and configured to switch between on and off;
- a lever disposed below the switch and configured to operate the switch;
- a battery mounting portion disposed at a rear of the switch and configured to mount a battery;
- a housing that houses the motor and the switch and has the battery mounting portion; and
- an operating unit disposed on an upper surface of the housing and configured to block upward movement of the lever.

* * * * *